United States Patent

Wang et al.

(10) Patent No.: US 10,925,031 B2
(45) Date of Patent: Feb. 16, 2021

(54) SMALL DATA TRANSMISSION METHOD AND RELATED DEVICE AND SYSTEM

(71) Applicant: Huawei Technologies Co., Ltd., Guangdong (CN)

(72) Inventors: Xinzheng Wang, Shanghai (CN); Tianle Deng, Shenzhen (CN); Kaijie Zhou, Shenzhen (CN); Xingxing Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/256,152

(22) Filed: Jan. 24, 2019

(65) Prior Publication Data

US 2019/0159168 A1    May 23, 2019

Related U.S. Application Data

(63) Continuation of application No. PCT/CN2016/097719, filed on Aug. 31, 2016.

(51) Int. Cl.
*H04W 68/02* (2009.01)
*H04L 5/00* (2006.01)
(Continued)

(52) U.S. Cl.
CPC .......... *H04W 68/02* (2013.01); *H04L 5/0037* (2013.01); *H04L 5/0053* (2013.01); *H04W 72/005* (2013.01); *H04W 72/0446* (2013.01)

(58) Field of Classification Search
CPC ... H04W 68/02; H04W 72/005; H04W 48/18; H04W 72/0446; H04W 76/12;
(Continued)

(56) References Cited

U.S. PATENT DOCUMENTS 8,302,024 B2    10/2012    Smith
8,635,353 B2    1/2014    Pope et al.
(Continued)

FOREIGN PATENT DOCUMENTS

CN    1997205 A    7/2007
CN    101730191 A    6/2010
(Continued)

OTHER PUBLICATIONS

Samsung, "Update of solution 2 with combining solution 3", SA WG2 Meeting #111,Oct. 19-23, 2015, Chengdu, P.R. China, 5 pages, S2-153302.
(Continued)

*Primary Examiner* — George Eng
*Assistant Examiner* — Jing Gao
(74) *Attorney, Agent, or Firm* — Kilpatrick Townsend & Stockton LLP

(57) ABSTRACT

The embodiments of the present disclosure disclose a small data transmission method and a related device and system. The method may include: broadcasting, by a base station, a paging message, where the paging message carries UE identifiers of a plurality of to-be-paged user equipment UE and small data sent to at least one of the to-be-paged UEs, and the small data is data whose data volume is less than a preset data volume threshold. In the present disclosure, small data may be sent to to-be-paged UE while the base station pages the UE, to reduce signaling and time overheads for sending the small data and improving communication efficiency.

16 Claims, 15 Drawing Sheets

(51) Int. Cl.
*H04W 72/00* (2009.01)
*H04W 72/04* (2009.01)

(58) Field of Classification Search
CPC ....... H04W 76/10; H04W 88/06; H04W 8/26; H04W 12/00503; H04W 48/20; H04W 68/00; H04W 72/04; H04W 72/0413; H04W 72/1273; H04W 74/0866; H04W 4/06; H04W 4/08; H04W 72/042; H04W 72/14; H04W 74/006; H04L 5/0037; H04L 5/0053
See application file for complete search history.

(56) References Cited

U.S. PATENT DOCUMENTS

| | | | |
|---|---|---|---|
| 2012/0282956 | A1 | 11/2012 | Kim et al. |
| 2013/0308564 | A1 | 11/2013 | Jain et al. |
| 2014/0086196 | A1 | 3/2014 | Zhu et al. |
| 2014/0140261 | A1 | 5/2014 | Kim et al. |
| 2014/0254490 | A1* | 9/2014 | Jain .......... H04B 15/00 370/328 |
| 2015/0103768 | A1 | 4/2015 | Chen et al. |
| 2015/0113128 | A1* | 4/2015 | Huang ......... H04W 68/025 709/224 |
| 2015/0195831 | A1* | 7/2015 | Du ............ H04W 74/004 370/329 |
| 2017/0195987 | A1* | 7/2017 | Zarifi ......... H04W 76/11 |
| 2017/0339722 | A1 | 11/2017 | Jiao |

FOREIGN PATENT DOCUMENTS

| | | | | |
|---|---|---|---|---|
| CN | 101771462 | A | 7/2010 | |
| CN | 102223715 | A | 10/2011 | |
| CN | 102333293 | A | 1/2012 | |
| CN | 102340754 | A | 2/2012 | |
| CN | 102802254 | A | 11/2012 | |
| CN | 103782652 | A | 5/2014 | |
| CN | 104202739 | A | 12/2014 | |
| CN | 105530706 | A | 4/2016 | |
| CN | 105592449 | A | 5/2016 | |
| CN | 105828436 | A | 8/2016 | |
| EP | 1082862 | A2 | 3/2001 | |
| EP | 2254378 | A1 | 11/2010 | |
| EP | 2509345 | A1 | 10/2012 | |
| EP | 3051893 | A1 | 8/2016 | |
| WO | 2000059252 | A1 | 10/2000 | |
| WO | 2011119680 | A2 | 9/2011 | |
| WO | 2013016862 | A1 | 2/2013 | |
| WO | WO-2013016862 | A1 * | 2/2013 | ............ H04W 68/00 |
| WO | 2016062210 | A1 | 4/2016 | |

OTHER PUBLICATIONS

Huawei, HiSilicon, "Downlink latency reduction for unsynchronized UEs", 3GPP TSG-RAN WG2 Meeting #91, Beijing, China, Aug. 24-28, 2015, 4 pages, R2-153373.

Javad Abdoli et al., "Filtered OFDM: A New Waveform for Future Wireless Systems", 2015 IEEE 16th International Workshop on Signal Processing Advances in Wireless Communications (SPAWC), Jul. 2015, pp. 66-70.

Thorsten Wild et al., "5G Air Interface Design based on Universal Filtered (UF-) OFDM", Proceedings of the 19th International Conference on Digital Signal Processing, Aug. 20-23, 2014, pp. 699-704.

Gerhard Fettweis et al., "GFDM—Generalized Frequency Division Multiplexing", 2009 IEEE 69th Vehicular Technology Conference (VTC Spring), Apr. 2009, pp. 1-4.

Gilberto Berardinelli et al., "On the potential of zero-tail DFT-spread-OFDM in 5G networks", 2014 IEEE 80th Vehicular Technology Conference (VTC Fall), Sep. 2014, 6 pages.

Bertrand Muquet et al., "Cyclic Prefixing or Zero Padding for Wireless Multicarrier Transmissions", IEEE Transactions on Communication, vol. 50, No. 12, Dec. 2002, pp. 2136-2148.

Giovanni Cherubini et al., "Filter Bank Modulation Techniques for Very High-Speed Digital Subscriber Lines", IEEE Communications Magazine, vol. 38, No. 5, May 2000, pp. 98-104.

S2-153302 Samsung, "Update of solution 2 with combining solution 3", SA WG2 Meeting #111, Oct. 19-23, 2015, Chengdu, P.R. China, total 5 pages.

R2-153373 Huawei, HiSilicon, "Downlink latency reduction for unsynchronized UEs", 3GPP TSG-RAN WG2 Meeting #91, Beijing, China, Aug. 24-28, 2015, total 4 pages.

J. Abdoli, M.. Jia, J. Ma, "Filtered OFDM: A new waveform for future wireless systems", 2015 IEEE 16th International Workshop on Signal Processing Advances in Wireless Communications (SPAWC), pp. 66-70, Jul. 2015.

T. Wild, F. Schaich, Y. Chen. "5G air interface design based on Universal Filtered (UF-) OFDM", 2014 19th International Conference on Digital Signal Processing (DSP), pp. 699-704, Aug. 2014.

G. Fettweis, M. Krondorf, and S. Bittner, "GFDM—Generalized Frequency Division Multiplexing", 2009 IEEE 69th Vehicular Technology Conference (VTC Spring), pp. 1-4, Apr. 2009.

G. Berardinelli et al., "On the potential of zero-tail DFT-spread-OFDM in 5G networks", 2014 IEEE 80th Vehicular Technology Conference (VTC Fall), pp. 1-6, Sep. 2014.

B. Muquet et al., "Cyclic prefixing or zero padding for wireless multicarrier transmissions", IEEE Trans. Commun., vol. 50, pp. 2136-2148, Dec. 2002.

G. Cherubini et al., "Filter bank modulation techniques for very high speed digital subscriber lines", IEEE Communications Magazine, vol. 38, No. 5, pp. 98-104, May 2000.

3GPP TS 22.368 V13.1.0 (Dec. 2014), 3rd Generation Partnership Project; Technical Specification Group Services and System Aspects; Service requirements for Machine-Type Communications (MTC); Stage 1 (Release 13), 26 pages.

Qualcomm Incorporated, Efficient small data transmission with S1-based architecture. SA WG2 Meeting #110 Jul. 6-10, 2015, Dubrovnik, Croatia, S2-152614, 10 pages.

* cited by examiner

SMALL DATA TRANSMISSION METHOD AND RELATED DEVICE AND SYSTEM

CROSS-REFERENCE TO RELATED APPLICATIONS

This application is a continuation of International Application No. PCT/CN2016/097719, filed on Aug. 31, 2016, the disclosure of which is hereby incorporated by reference in its entirety.

TECHNICAL FIELD

The present disclosure relates to the field of communications technologies, and in particular, to a small data transmission method and a related device and system.

BACKGROUND

Currently, in a Long Term Evolution (LTE) or LTE-advanced (LTE-A) system of the 3rd Generation Partnership Project (3GPP), when user equipment (UE) transmits no data for a long time (for example, the UE is in an RRC_IDLE mode RRC_IDLE or in an out-of-synchronization mode), a Radio Resource Control (RRC) connection of the user equipment is released. Therefore, after downlink data of this type of UE subsequently arrives, a base station needs to first trigger, by using a paging process, the UE to recover the RRC signaling connection and complete uplink random access to switch to a connected mode before transmitting user plane data. Currently, a paging process and a control plane connection recovery process require approximately hundreds of milliseconds.

For example, in a machine to machine (M2M) communication scenario, UE is usually in an RRC_IDLE or out-of-synchronization mode. If a base station needs to send small data (for example, a query command sent by the base station to a smart meter) to the UE, the UE needs to complete a paging process and a control plane connection recovery process to receive the small data. However, a ratio of a time spent in signaling interaction of the procedure to that spent in transmission of the small data is relatively large, and transmission costs may be relatively high due to an excessively small data transmission volume, resulting in a waste of signaling overheads and radio resources.

SUMMARY

To resolve the technical problem, embodiments of the present disclosure provide a small data transmission method and a related device and system, to resolve a problem of optimizing small data transmission in a communications system.

According to a first aspect, an embodiment of the present disclosure provides a small data transmission method. The method may include:

broadcasting, by a base station, a paging message, where the paging message carries UE identifiers of to-be-paged user equipments UEs and small data sent to at least one of the to-be-paged UEs, and the small data is data whose data volume is less than a preset data volume threshold. In this embodiment of the present disclosure, while the base station pages to-be-paged UE, small data may be conveniently sent to the UE that needs to receive the small data. In this way, the small data may be quickly sent to the corresponding to-be-paged UE, communication costs required by the UE to receive the small data can be reduced, and signaling and time overheads for sending the small data are reduced and communication efficiency is improved.

With reference to the first aspect, in a first possible implementation, the broadcasting, by a base station, a paging message includes: arranging, adding, and broadcasting, by the base station, the UE identifiers and the small data in the paging message according to a preset arrangement rule. In this embodiment of the present disclosure, the base station and the UE may agree on a small data transmission rule in advance. To be specific, the base station performs sending according to the preset arrangement rule, and the UE parses corresponding small data according to the preset arrangement rule agreed on, so that the small data between the base station and UE is simpler and more precise.

With reference to the first possible implementation of the first aspect, in a second possible implementation, the paging message carries UE identifiers of to-be-paged N UEs and small data sent to the to-be-paged N UEs, and N is an integer greater than 0; and the arranging, adding, and broadcasting, by the base station, the UE identifiers and the small data in the paging message according to a preset arrangement rule includes: arranging, by the base station, the small data of the to-be-paged N UEs based on an arrangement sequence of the UE identifiers of the to-be-paged N UEs in the paging message, and adding the arranged small data of the to-be-paged N UEs to the paging message for broadcasting. In this embodiment of the present disclosure, UE may search for corresponding small data based on an arrangement sequence of a UE identifier of the UE in the paging message. To be specific, the base station and the UE do not need to agree in advance, and the UE finds the corresponding small data of the UE by using the arrangement sequence of the UE identifier. Therefore, a carrying manner is flexible and a parsing manner is simple.

With reference to the second possible implementation of the first aspect, in a third possible implementation, data lengths of the small data of the to-be-paged N UEs are consistent. In this embodiment of the present disclosure, small data transmission between the base station and the UE may be simpler. This is because regardless of whether to-be-paged UE needs to receive small data, a time-frequency resource having a fixed size may be reserved for transmission in a uniform format. During data parsing by UEs, for some UEs, the time-frequency resource having the fixed size may be empty or may not be filled with data, or the like. However, generally, as it is considered that all UEs carry small data and data lengths are consistent, a transmission rule may be simpler, and a parsing process of to-be-paged UE is more convenient.

With reference to the second possible implementation of the first aspect, in a fourth possible implementation, data lengths of the small data of the to-be-paged N UEs are inconsistent. The paging message further carries first indication information, and the first indication information is used to indicate data length information of the small data respectively corresponding to the to-be-paged N UEs. In this embodiment of the present disclosure, when transmission lengths of the small data between the base station and the UEs are inconsistent, the lengths of the small data may be retained and are notified to the UEs by adding length indication information of the small data to the paging message, to avoid communication resource waste.

With reference to the first possible implementation of the first aspect, in a fifth possible implementation, the paging message carries UE identifiers of to-be-paged N UEs, second indication information used to indicate that M of the to-be-paged N UEs need to receive corresponding small data, and the small data sent to the to-be-paged M UEs, both N and M are integers greater than 0, and N is greater than M; and the arranging, adding, and broadcasting, by the base station, the UE identifiers and the small data in the paging message according to a preset arrangement rule includes: arranging, by the base station, the small data of the to-be-paged M UEs based on an arrangement sequence of UE identifiers of the to-be-paged M UEs in the paging message, and adding the arranged small data of the to-be-paged M UEs to the paging message for broadcasting. In this embodiment of the present disclosure, when some to-be-paged UEs do not need to receive small data, small data may be similarly carried and parsed by using a UE identifier arrangement manner. In a method, the paging message carries the second indication information that is used to indicate whether small data needs to be received and that corresponds to the UE identifiers of the to-be-paged UEs, to distinguish to-be-paged UE that needs to receive small data from to-be-paged UE that does not need to receive small data.

With reference to the fifth possible implementation of the first aspect, in a sixth possible implementation, data lengths of the small data of the to-be-paged M UEs are consistent.

With reference to the fifth possible implementation of the first aspect, in a seventh possible implementation, data lengths of the small data of the to-be-paged M UEs are inconsistent, the paging message further carries first indication information, and the first indication information is used to indicate data length information of the small data respectively corresponding to the to-be-paged M UEs.

With reference to the first aspect, in an eighth possible implementation, the paging message carries location information of time-frequency resources that are in the paging message and that correspond to the UE identifiers of the to-be-paged UEs that need to receive small data, and the location information of the time-frequency resources is used by the UEs to parse and read corresponding small data of the UEs based on the UE identifiers of the UEs and the location information of time-frequency resources. In this embodiment of the present disclosure, information about time-frequency resources occupied by small data corresponding to all to-be-paged UEs that need to receive the small data may be directly carried in the paging message, and is associated with corresponding UE identifiers of the UEs. Therefore, the UEs can quickly parse and read the small data of the UEs based on this.

With reference to the first aspect, or with reference to the first possible implementation of the first aspect, or with reference to the second possible implementation of the first aspect, or with reference to the third possible implementation of the first aspect, or with reference to the fourth possible implementation of the first aspect, or with reference to the fifth possible implementation of the first aspect, or with reference to the sixth possible implementation of the first aspect, or with reference to the seventh possible implementation of the first aspect, or with reference to the eighth possible implementation of the first aspect, in a ninth possible implementation, a time-frequency resource block occupied by the small data is an idle time-frequency resource block other than a time-frequency resource block occupied by the UE identifiers of the to-be-paged UEs in the paging message. In this embodiment of the present disclosure, the small data and related information are carried in the idle time-frequency resource block other than the resource block occupied by the UE identifiers. In this way, various terminals including user equipment that has not agreed on a related protocol of receiving the small data in the paging message with the base station can still perform demodulation paging in an existing manner of parsing the paging message, and are not affected. In addition, user equipment that has agreed on a related protocol may perform parsing based on a parsing manner agreed on in the protocol.

Optionally, the paging message carries a group identifier of a to-be-paged group, and the to-be-paged UEs belong to the to-be-paged group; the broadcasting, by a base station, a paging message includes: broadcasting, by the base station, the group identifier of the to-be-paged group on a physical downlink control channel PDCCH of a downlink subframe, and broadcasting the UE identifiers and the small data on a physical downlink shared channel PDSCH corresponding to the PDCCH of the downlink subframe.

According to a second aspect, an embodiment of the present disclosure provides a small data transmission method. The method may include:

monitoring, by user equipment UE, a paging message broadcast by a base station, where the paging message carries UE identifiers of to-be-paged user equipments UEs and small data sent to at least one of the to-be-paged UEs, and the small data is data whose data volume is less than a preset data volume threshold;

determining, by the UE based on the UE identifiers, whether the UE is paged; and if the UE is paged, when determining that the UE has small data, parsing and reading, by the UE, the small data carried by the paging message.

With reference to the second aspect, in a first possible implementation, the when determining that the UE has small data, parsing and reading, by the UE, the small data carried by the paging message includes: calculating, by the UE according to a preset arrangement rule, a time-frequency resource location occupied by the small data corresponding to a UE identifier that is sent by the base station to the UE in the paging message; and parsing and reading, based on the time-frequency resource location, the small data corresponding to the UE identifier of the UE.

With reference to the second aspect, in a second possible implementation, the paging message carries indication information used to indicate whether each of the to-be-paged UEs needs to parse and read small data; and the when determining that the UE has small data, parsing and reading, by the UE, the small data carried by the paging message includes: determining, by the UE based on the indication information, whether the UE has the small data; and if the UE has the small data, parsing and reading, by the UE, the small data carried in the paging message.

With reference to the second aspect, in a third possible implementation, the paging message carries location information of a time-frequency resource that is in the paging message and that corresponds to a UE identifier of to-be-paged UE that needs to receive small data; and the parsing and reading, by the UE, the small data carried in the paging message includes: searching, by the UE, for corresponding location information of a time-frequency resource based on a UE identifier of the UE, and parsing and reading the corresponding small data of the UE.

Optionally, the paging message carries a group identifier of a to-be-paged group, and the to-be-paged UEs belong to the to-be-paged group; the monitoring, by user equipment UE, a paging message broadcast by a base station includes: monitoring, by the UE, the group identifier of the to-be-paged group on a physical downlink control channel PDCCH of a downlink subframe, and monitoring the UE identifiers and the small data on a physical downlink shared channel PDSCH corresponding to the PDCCH of the downlink subframe.

Optionally, the determining, by the UE based on the UE identifiers when determining that the UE has the small data, whether the UE is paged includes: when determining that the UE has the small data, determining, by the UE based on the group identifier, whether the UE is in the to-be-paged group; if the UE is in the to-be-paged group, determining whether the identifier of the UE is in the to-be-paged UE identifiers; and if the identifier of the UE is in the to-be-paged UE identifiers, determining that the UE is paged.

According to a third aspect, an embodiment of the present disclosure provides a base station. The base station may include: a communications interface, a memory, and a processor, where the memory is configured to store program code, and the processor is configured to invoke the program code stored in the memory, to perform the following step: broadcasting a paging message through the communications interface, where the paging message carries UE identifiers of to-be-paged user equipments UEs and small data sent to at least one of the to-be-paged UEs, and the small data is data whose data volume is less than a preset data volume threshold.

With reference to the third aspect, in a first possible implementation, the processor being configured to broadcast a paging message is specifically: arranging, adding, and broadcasting the UE identifiers and the small data in the paging message according to a preset arrangement rule.

With reference to the first possible implementation of the third aspect, in a second possible implementation, the paging message carries UE identifiers of to-be-paged N UEs and small data sent to the to-be-paged N UEs, and N is an integer greater than 0; and the arranging, adding, and broadcasting, by the processor, the UE identifiers and the small data in the paging message according to a preset arrangement rule is specifically: arranging the small data of the to-be-paged N UEs based on an arrangement sequence of the UE identifiers of the to-be-paged N UEs in the paging message, and adding the arranged small data of the to-be-paged N UEs to the paging message for broadcasting.

With reference to the second possible implementation of the third aspect, in a third possible implementation, data lengths of the small data of the to-be-paged N UEs are consistent.

With reference to the second possible implementation of the third aspect, in a fourth possible implementation, data lengths of the small data of the to-be-paged N UEs are inconsistent, the paging message further carries first indication information, and the first indication information is used to indicate data length information of the small data respectively corresponding to the to-be-paged N UEs.

With reference to the first possible implementation of the third aspect, in a fifth possible implementation, the paging message carries UE identifiers of to-be-paged N UEs, second indication information used to indicate that M of the to-be-paged N UEs need to receive corresponding small data, and the small data sent to the to-be-paged M UEs, both N and M are integers greater than 0, and N is greater than M; and the arranging, adding, and broadcasting, by the processor, the UE identifiers and the small data in the paging message according to a preset arrangement rule is specifically: arranging the small data of the to-be-paged M UEs based on an arrangement sequence of the UE identifiers of the to-be-paged M UEs in the paging message, and adding the arranged small data of the to-be-paged M UEs to the paging message for broadcasting.

With reference to the fifth possible implementation of the third aspect, in a sixth possible implementation, data lengths of the small data of the to-be-paged M UEs are consistent.

With reference to the fifth possible implementation of the third aspect, in a seventh possible implementation, data lengths of the small data of the to-be-paged M UEs are inconsistent, the paging message further carries first indication information, and the first indication information is used to indicate data length information of the small data respectively corresponding to the to-be-paged M UEs.

With reference to the third aspect, in an eighth possible implementation, the paging message carries location information of time-frequency resources that are in the paging message and that correspond to the UE identifiers of the to-be-paged UEs that need to receive small data, and the location information of the time-frequency resources issued by the UEs to parse and read corresponding small data of the UEs based on the UE identifiers of the UEs and the location information of time-frequency resources.

With reference to the third aspect, or with reference to the first possible implementation of the third aspect, or with reference to the second possible implementation of the third aspect, or with reference to the third possible implementation of the third aspect, or with reference to the fourth possible implementation of the third aspect, or with reference to the fifth possible implementation of the third aspect, or with reference to the sixth possible implementation of the third aspect, or with reference to the seventh possible implementation of the third aspect, or with reference to the eighth possible implementation of the third aspect, in a ninth possible implementation, a time-frequency resource block occupied by the small data is an idle time-frequency resource block other than a time-frequency resource block occupied by the UE identifiers of the to-be-paged UEs in the paging message.

According to a fourth aspect, an embodiment of the present disclosure provides user equipment UE. The UE may include: a communications interface, a memory, and a processor, where the memory is configured to store program code, and the processor is configured to invoke the program code stored in the memory, to perform the following steps: monitoring, by using the communications interface, a paging message broadcast by a base station, where the paging message carries UE identifiers of to-be-paged user equipments UEs and small data sent to at least one of the to-be-paged UEs, and the small data is data whose data volume is less than a preset data volume threshold; determining, based on the UE identifiers, whether the UE is paged; and if the UE is paged, when determining that the UE has small data, parsing and reading the small data carried by the paging message.

With reference to the fourth aspect, in a first possible implementation, the processor being configured to: when determining that the UE has small data, parse and read the small data carried by the paging message is specifically: calculating, according to a preset arrangement rule, a time-frequency resource location occupied by the small data corresponding to a UE identifier that is sent by the base station to the UE in the paging message; and parsing and reading, based on the time-frequency resource location, the small data corresponding to the UE identifier of the UE.

With reference to the fourth aspect, in a second possible implementation, the paging message carries indication information used to indicate whether each of the to-be-paged UEs needs to parse and read small data; and the processor being configured to: when determining that the UE has small data, parse and read the small data carried by the paging message is specifically: determining, based on the indication information, whether the UE has the small data; and if the UE has the small data, parsing and reading the small data carried in the paging message.

With reference to the fourth aspect, in a third possible implementation, the paging message carries location information of a time-frequency resource that is in the paging message and that corresponds to a UE identifier of to-be-paged UE that needs to receive small data; and the when determining that the UE has small data, parsing and reading, by the processor, the small data carried by the paging message is specifically: when determining that the UE has the small data, searching for corresponding location information of a time-frequency resource based on a UE identifier of the UE, and parsing and reading the corresponding small data of the UE.

A fifth aspect of the embodiments of the present disclosure provides a communications system, including the base station according to the third aspect and the user equipment UE according to the fourth aspect.

A sixth aspect of the embodiments of the present disclosure provides a device. The device includes a processor. The processor is configured to support the device in performing corresponding functions in the small data transmission method according to the first aspect. The device may further include a memory. The memory is configured to couple to the processor, and store a necessary program instruction and necessary data of the device. The device may further include a communications interface, configured to perform communication between the device and another device or communications network.

A seventh aspect of the embodiments of the present disclosure provides a device. The device includes a processor. The processor is configured to support the device in performing corresponding functions in the small data transmission method according to the second aspect. The device may further include a memory. The memory is configured to couple to the processor, and store a necessary program instruction and necessary data of the device. The device may further include a communications interface, configured to perform communication between the device and another device or communications network.

An eighth aspect of the embodiments of the present disclosure provides a computer storage medium, configured to store a computer software instruction used by the device according to the sixth aspect, and the computer software instruction includes a program designed to implement the foregoing aspects.

A ninth aspect of the embodiments of the present disclosure provides a computer storage medium, configured to store a computer software instruction used by the device according to the seventh aspect, and the computer software instruction includes a program designed to implement the foregoing aspects.

In the embodiments of the present disclosure, the base station broadcasts the paging message, where the paging message carries the UE identifiers of the to-be-paged user equipments UEs and the small data sent to the at least one of the to-be-paged UEs, and the small data is data whose data volume is less than the preset data volume threshold. In this embodiment of the present disclosure, while the base station pages to-be-paged UE, small data may be conveniently sent to the UE that needs to receive the small data. In this way, the small data may be quickly sent to the corresponding to-be-paged UE, and communication costs required by the UE to receive the small data can be reduced. In comparison with the prior art in which before receiving the small data sent by the base station, the UE needs to complete a complex procedure such as random access and switching to a connected mode after receiving the paging message, signaling and time overheads for sending the small data are reduced and communication efficiency is improved.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

Figure 1:
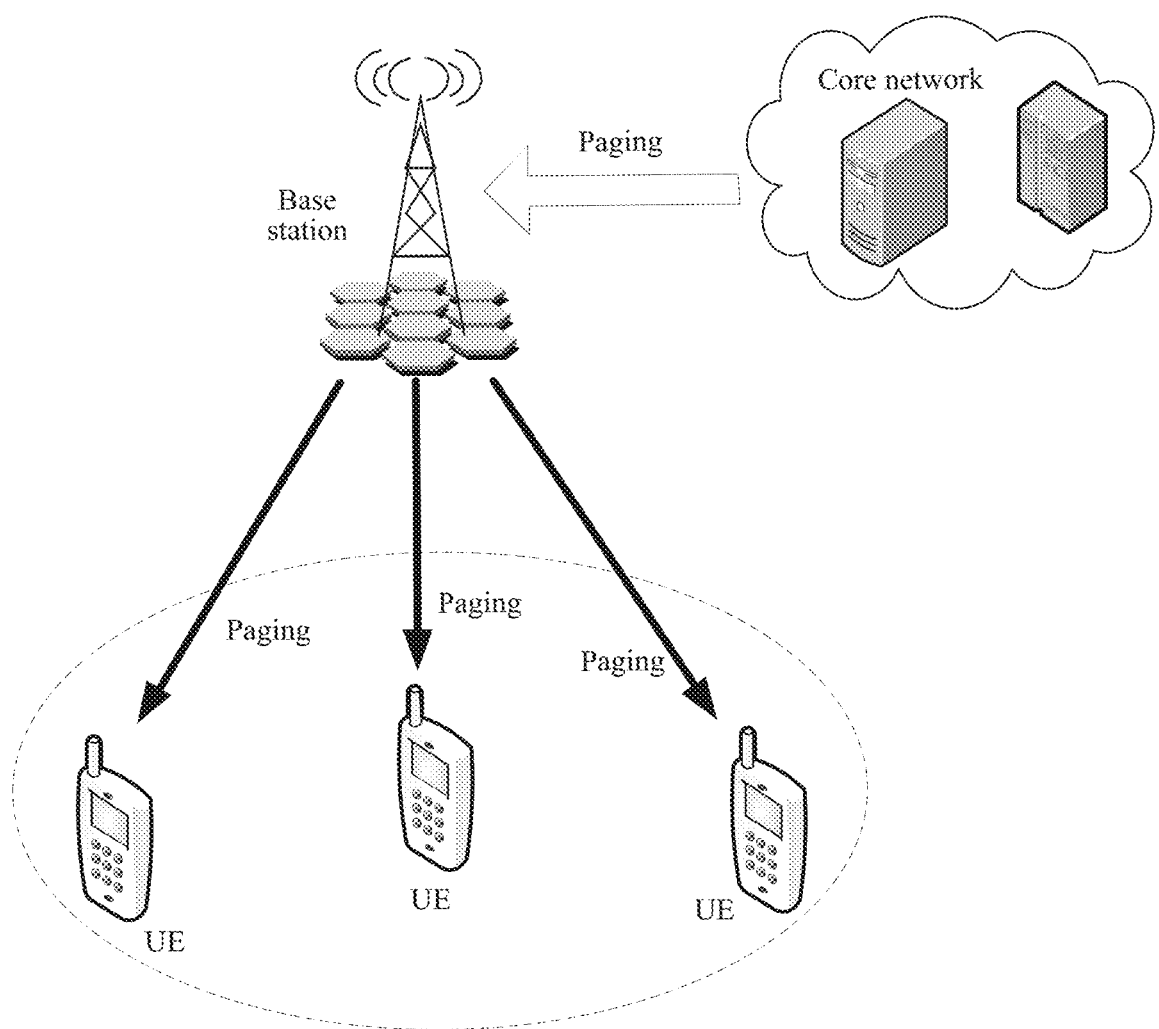
FIG. 1 is an architectural diagram of a communications network according to an embodiment of the present disclosure.

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In the embodiments of the present disclosure, an "embodiment" mentioned means that a particular feature, structure, or property described with reference to the embodiment may be included in at least one embodiment of the present disclosure. The phrase shown in various locations in the specification may not necessarily refer to a same embodiment, and is not an independent or optional embodiment exclusive from another embodiment. A person skilled in the art explicitly and implicitly understands that an embodiment described in the embodiments of the present disclosure may be combined with another embodiment.

Some terms in this application are explained and described below for the convenience of understanding by a person skilled in the art.

(1) User equipment (UE) may be referred to as an access terminal, a terminal device, a subscriber unit, a subscriber station, a mobile station, a mobile console, a remote station, a remote terminal, a mobile device, a user terminal, a terminal, a wireless communications device, a user agent, or a user apparatus. UE may be a cellular phone, a cordless phone, a smartphone, a Session Initiation Protocol (SIP) phone, a wireless local loop (WLL) station, a smart band, a smart wearable device, an MP3 player (Moving Picture Experts Group Audio Layer III), an MP4 (Moving Picture Experts Group Audio Layer IV) player, a personal digital assistant (PDA), a handheld device having a wireless communication function, a computing device, another processing device connected to a wireless modem, an in-vehicle device, a terminal device in a future 5G network, and the like. It may be further understood that UE may further be a smart communications terminal integrated with a sensor, a meter that can be remotely read, some other smart hardware, or the like in M2M.

(2) A base station may be understood as a radio access network (Radio Access Network, RAN) device on an access network side in a cellular network. The RAN device is a device for accessing a wireless network by a terminal, and includes, but is not limited to: an evolved node B (evolved Node B, eNB), a radio network controller (RNC), a node B (Node B, NB), a base station controller (BSC), a base transceiver station (BTS), a home NodeB (for example, Home evolved NodeB, or Home Node B, HNB), or a baseband unit (BBU), or may be, for another example, a center controller. The center controller is a global control node connected to a coordinator of various VPANs by using a wired or wireless connection link, and is responsible for performing unified coordination and management on running of the various VPANs. It should further be understood that, in the embodiments of the present disclosure, a base station may be a base station (BTS) in the GSM or CDMA, may also be a base station (NodeB, NB) in the WCDMA, and may further be an evolved NodeB (Evolved Node B, eNB, or eNodeB) in the LTE, or a base station device in a future 5G network, and this is not limited in the present disclosure.

(3) Physical downlink control channel (PDCCH): A PDCCH carries scheduling and other control information, specifically including a transmission format, resource allocation, uplink scheduling grant, power control and uplink retransmission information, and the like. A PDCCH channel is a set of a group of physical resource elements, and carries uplink and downlink control information. Based on different function domains of the PDCCH channel, information carried by the PDCCH is divided into common control information (common search space) and dedicated control information (dedicated search space). A search space defines a start location and a channel search manner (refer to a chapter of a PDCCH detection process) of blind detection. The PDCCH channel mainly carries PUSCH and PDSCH channel control information (DCI). PDCCH information of different terminals is distinguished by using RNTI information corresponding to the terminals, that is, CRCs of DCI of the terminals are scrambled by using RNTIs.

(4) A physical downlink shared channel (PDSCH) is one of LTE physical downlink channels and is a downlink link channel used to carry main user data in LTE, may be used for all user data, and further includes a system broadcast message and a paging message (there is no particular physical layer paging channel in LTE) not transmitted on a PBCH.

(5) "A plurality of" refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

It should be understood that, the technical solutions of the embodiments of the present disclosure may be applied to various communications systems, such as: a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, and a Universal Mobile Telecommunications System (UMTS).

The following describes the embodiments of this application with reference to accompanying drawings.

For ease of understanding the embodiments of the present disclosure, the following first describes a communications network architecture on which the embodiments of the present disclosure are based. FIG. 1 is an architectural diagram of a communications network according to an embodiment of the present disclosure. The network architecture includes a core network, a base station, and a plurality of user equipments UEs. The core network (including related devices in the core network, for example, a Mobility Management Entity (MME)) notifies, by using a paging message, the base station of UE that needs to be paged. The paging message may include: an identity (mandatorily, an international mobile subscriber identity (IMSI), and optionally, a temporary mobile subscriber identity (TMSI)) of the UE within a paging range, a paging reason, and the like. After receiving paging, the base station (which may be a radio network controller (RNC) of the base station) determines an area and a current state of the UE based on the IMSI, and initiates different types of paging to the UE based on different cases. In addition, the core network further provides data support and a related service for a process of communication between the base station and the UE. It may be understood that the network architecture in FIG. 1 is only an implementation in this embodiment of the present disclosure, and the network architecture in this embodiment of the present disclosure includes, but is not limited only to, the foregoing network architecture.

Figure 2:
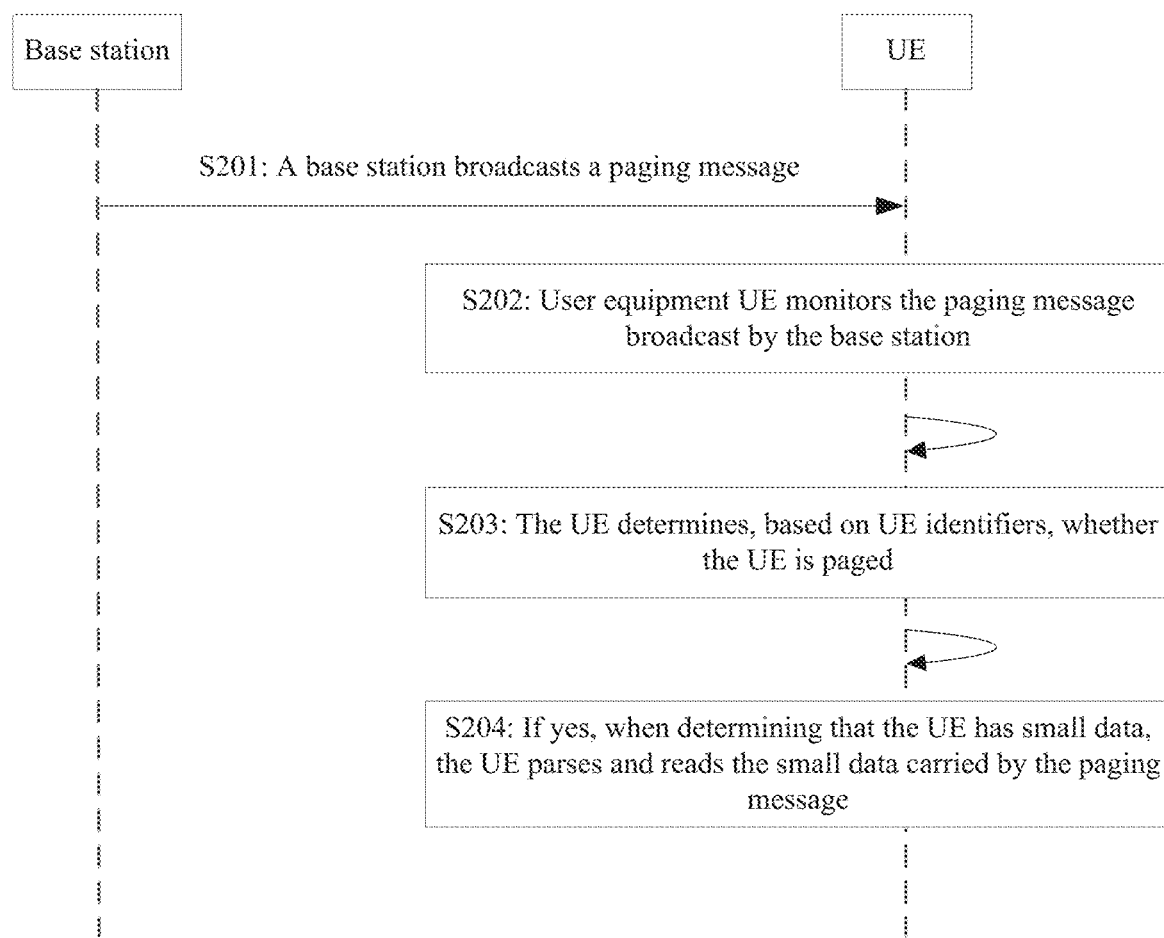
FIG. 2 is a schematic flowchart of a small data transmission method according to an embodiment of the present disclosure.

FIG. 2 is a schematic flowchart of a small data transmission method according to an embodiment of the present disclosure, and may be applied to the communications network system in FIG. 2. The following provides descriptions with reference to FIG. 2 from the perspective of interaction between a base station and UE. As shown in FIG. 2, the method may include the following steps S201 to S204.

Step S201: A base station broadcasts a paging message.

Specifically, the base station broadcasts the paging message, where the paging message carries UE identifiers of to-be-paged user equipments UEs and small data that needs to be sent to at least one (which may be one or more) of the to-be-paged UEs, and the small data is data whose data volume is less than a preset data volume threshold. To be specific, in addition to paging-related information of the plurality of to-be-paged UEs such as the UE identifiers of the to-be-paged UEs in the prior art, the paging message may further carry the small data that the at least one of the to-be-paged UEs needs to receive. In this embodiment of the present disclosure, data of some to-be-paged UEs that need to receive the data is directly carried in the paging message, so that the UEs do not need to perform a subsequent procedure such as random access to receive the data, and the data is data whose data volume is less than a preset quantity threshold. Because the data volume is relatively small, the data is easy to carry and may be carried in the paging message. Assuming that the data volume is excessively large, the data obviously cannot be carried in the paging message. Therefore, this can improve communication efficiency in a small data transmission scenario. Certainly, when the data volume is relatively large, a normal communication procedure in the prior art may still be used. To be specific, after completing uplink random access and switching to a connected mode, UE having received paging receives related data.

For example, when the base station is an eNodeB, after receiving a paging message, the eNodeB deciphers content in the paging message, to obtain a tracking area identity (TAI) list of the UE, and performs air interface paging in a cell that belongs to a tracking area in the list. A core network (CN) domain indication in the paging message is not decoded on the eNodeB and is transparently transmitted to the UE. When the eNodeB simultaneously receives a plurality of paging requirements of a plurality of UEs, to reduce signaling overheads, paging content of all the UEs is packed into one paging message, and each piece of information of UE is included in a paging record list for storage. In addition, when the eNodeB transmits the paging message on an air interface, paging content of UEs having a same paging occasion is summarized by the eNodeB into one paging message, and is transmitted to related UEs through a paging channel. The UE calculates a monitoring time by using a paging location, and receives the paging message at the corresponding time. It may be understood that to save electricity, each cell (eNodeB) broadcasts a default DRX paging period of the cell to all UEs in the cell by using system information. UE may receive paging based on a discontinuous reception (DRX) rule, or each UE may set particular DRX of the UE based on an electricity quantity and a paging system of the UE.

It should be noted that although this embodiment of the present disclosure is subsequently described in detail mainly based on an LTE system and a related channel structure in the LTE system, it does not indicate that this embodiment of the present disclosure can be implemented only in the LTE system and the corresponding channel. Any communications system and a related transmission channel using the method of the present disclosure without departing from the essential core of the present disclosure fall within the protection scope of the present disclosure.

In step S201, in a possible implementation A, the paging message carries a group identifier of a to-be-paged group, and the to-be-paged UEs belong to the to-be-paged group; and the broadcasting, by a base station, a paging message may be specifically: broadcasting, by the base station, the group identifier of the to-be-paged group on a physical downlink control channel PDCCH of a downlink subframe, and broadcasting the UE identifiers and the small data on a physical downlink shared channel PDSCH corresponding to the PDCCH of the downlink subframe. To be specific, UE first monitors the PDCCH channel, and if finding that a group of the UE is not paged, the UE may not continue to monitor the PDSCH channel, to reduce power consumption.

Further, in a possible implementation B, the broadcasting, by a base station, a paging message may be specifically: arranging, adding, and broadcasting, by the base station, the UE identifiers and the small data in the paging message (which may be specifically a PDSCH corresponding to a PDCCH of a downlink subframe of the paging message) according to a preset arrangement rule. Because one broadcast paging message may carry small data of a plurality of to-be-paged UEs, each UE needs to monitor the PDSCH to determine whether there is small data of the UE that needs to be received, and to determine how to parse the small data of the UE from a plurality of small data if there is the small data of the UE that needs to be received. Therefore, the UE needs to perform parsing according to a rule. The preset arrangement rule may be agreed on by the base station and the UE in advance (that is, stipulated in a related protocol in advance). In this way, the UE may parse and read the small data of the UE according to the preset arrangement rule in a time-frequency resource location corresponding to the PDSCH.

Further, in a possible implementation C, assuming that the paging message carries UE identifiers of to-be-paged N UEs and small data sent to the to-be-paged N UEs, and N is an integer greater than 0; the arranging, adding, and broadcasting, by the base station, the UE identifiers and the small data in the paging message (which may be specifically a PDSCH corresponding to a PDCCH of a downlink subframe of the paging message) according to a preset arrangement rule may be specifically: arranging, by the base station, the small data of the to-be-paged N UEs based on an arrangement sequence of the UE identifiers of the to-be-paged N UEs on the PDSCH, and adding the arranged small data of the to-be-paged N UEs to the corresponding PDSCH for broadcasting. To be specific, when a quantity of the to-be-paged UEs is equal to a quantity of to-be-paged UEs that need to receive small data, that is, each to-be-paged UE needs to receive small data, the small data may be directly arranged and carried based on the arrangement sequence of the UE identifiers of all the to-be-paged UEs on the PDSCH. For example, the arrangement sequence of the UE identifiers is a descending order or an ascending order in arrangement, and the small data may be arranged and carried following the UE identifiers in a corresponding manner. It may be understood that there may alternatively be another regular arrangement rule, provided that the base station and the UE agree on the arrangement rule.

Further, with reference to the implementation C, in a possible implementation D, data lengths of the small data of the to-be-paged N UEs may be all set to be consistent, that is, it is limited that bit lengths of the small data are set to be equal. In this way, after receiving the paging message, UE can find, based only on an arrangement sequence corresponding to a UE identifier of the UE and a consistent preset bit length, a time-frequency resource location occupied by small data of the UE. It may be understood that if small data of to-be-paged UE does not reach the consistent preset bit length, an empty character may be used for filling, to ensure that the bit lengths of the small data corresponding to the to-be-paged UEs are all the same on the whole. It may be understood that when the lengths of the small data corresponding to the UEs are consistent, two cases are included. In a first case, the base station and the UE agree on, in advance, that transmission and parsing are performed with a fixed length. In a second case, the base station and the UE do not need to agree on in advance, and specific length information of the consistent length is carried in a time-frequency resource location of the paging message sent by the base station, to instruct the UE to perform parsing and reading based on the length information. Certainly, the UE may alternatively be implicitly instructed by using another algorithm or the like, and this is not specifically limited in the present disclosure.

Further, with reference to the implementation C, in a possible implementation E, assuming that data lengths of the small data of the to-be-paged N UEs are inconsistent, the paging message further carries first indication information, and the first indication information is used to indicate data length information of the small data respectively corresponding to the to-be-paged N UEs. To be specific, when the lengths of the small data are inconsistent, if UE knows an arrangement sequence of small data corresponding to the UE and length information of the small data, the UE can know a time-frequency resource location occupied by the small data of the UE, to perform parsing and reading.

In step S201, in a possible implementation F, the paging message carries UE identifiers of to-be-paged N UEs, second indication information used to indicate that M of the to-be-paged N UEs need to receive corresponding small data, and the small data sent to the to-be-paged M UEs, both N and M are integers greater than 0, and N is greater than M. The base station arranges the small data of the to-be-paged M UEs based on an arrangement sequence of UE identifiers of the to-be-paged M UEs on the PDSCH, and adding the arranged small data of the to-be-paged M UEs to the PDSCH for broadcasting. In this embodiment of the present disclosure, if only some to-be-paged UEs need to receive small data, only the small data of the some UEs that need to receive the small data may be carried, and the UEs may still read, based on the arrangement sequence of the UE identifiers of the to-be-paged M UEs on the PDSCH, the small data arranged and added on the PDSCH. It may be understood that in this case, the paging message needs to carry the second indication information used to indicate that the M of the to-be-paged N UEs need to receive corresponding small data, so that UE learns, based on the indication information, that whether the UE needs to receive small data, other to-be-paged UEs that need to receive small data, and to-be-paged UEs that do not need to receive small data. In this way, the UE may determine, based on the information, a time-frequency resource location used by the UE to read the small data corresponding to the UE.

Further, in a possible implementation G, data lengths of the small data of the to-be-paged M UEs are consistent. A principle thereof is similar to that in the implementation D corresponding to step S201, and details are not described herein again.

Further, in a possible implementation H, data lengths of the small data of the to-be-paged M UEs are inconsistent, the paging message further carries first indication information, and the first indication information is used to indicate data length information of the small data respectively corresponding to the to-be-paged M UEs. A principle thereof is similar to that in the implementation E corresponding to step S201, and details are not described herein again.

In step S201, in a possible implementation I, the paging message carries location information of time-frequency resources that are in the paging message (which may be specifically a PDSCH corresponding to the paging message) and that correspond to the UE identifiers of the to-be-paged UEs that need to receive small data, and the location information of the time-frequency resources is used by the UEs to directly parse and read corresponding small data of the UEs based on the UE identifiers of the UEs and the location information of time-frequency resources. In this embodiment of the present disclosure, the base station and the UE do not need to agree on the preset arrangement rule before paging, only location information of a time-frequency resource or related location indication information of the small data needs to be directly carried in the paging message, and the UE may perform parsing and reading in the paging message.

In step S201, in a possible implementation J, a time-frequency resource block occupied by the small data is an idle time-frequency resource block other than a time-frequency resource block occupied by the UE identifiers of the to-be-paged UEs in the paging message (which may be specifically a PDSCH corresponding to the paging message). To be specific, the key of this embodiment of the present disclosure is that the time-frequency resource location occupied by the small data may be different from the time-frequency resource occupied by the UE identifiers of the to-be-paged UEs in the prior art. In other words, common bit arrangement and resource mapping of the paging message in the prior art are not changed, and another time-frequency resource other than the time-frequency resource of the paging message in an existing system is used. Beneficial effects thereof are that some UEs not support delivering of the small data by using the paging message are not affected, and can still perform receiving, parsing, and reading in a manner of the paging message in the prior art.

In step S201, it may be further understood that the paging message may carry only small data of some to-be-paged UEs and receiving indication information of relatively large data of some UEs. Some of the time-frequency resources occupied by the small data may conform to the preset arrangement rule agreed on, and other time-frequency resources are directly carried in the paging message for reading by the UE. That is, in this embodiment of the present disclosure, manners of carrying a plurality of types of small data in the paging message may be properly combined, and examples are not listed herein one by one.

Step S202: User equipment UE monitors the paging message broadcast by the base station.

Specifically, the paging message carries the UE identifiers of the to-be-paged user equipments UEs and the small data sent to at least one of the to-be-paged UEs, and the small data is data whose data volume is less than a preset data volume threshold. An LTE system is used as an example. When UE is in an RRC_IDLEmode or an out-of-synchronization mode, the UE may receive the paging message and a system message, and the paging message and the system message are both broadcast. For the LTE system, the paging message and the system message are both transmitted by scheduling. To be specific, before sending the paging message and the system message, a network side first schedules, by using a PDCCH, a physical resource, that is, a PDSCH resource for transmitting the paging message and the system message. For the paging message, a network side scrambles the PDCCH by using a P-RNTI; and for the system message, the network side scrambles the PDCCH by using an SI-RNTI. When descrambling the PDCCH, a user terminal descrambles the PDCCH separately by using the P-RNTI corresponding to the paging message and the SI-RNTI corresponding to the system message, to correctly obtain, by descrambling, scheduling information carried by the PDCCH. The user terminal receives the paging message or the system message in an indicated physical resource location based on the scheduling information carried by the PDCCH. It may be understood that to reduce power consumption, the user terminal in the RRC_IDLE mode monitors the paging message in a particular period by using DRX (Discontinuous Reception, discontinuous reception). To be specific, the user terminal wakes up at intervals to monitor, in a fixed location, the paging message scheduled by the PDCCH scrambled by using the P-RNTI, so that the UE in an RRC_IDLE mode "wakes up" only in a predefined time period to receive the paging message and may maintain a "sleep" state in another time. This can reduce power consumption and increase a battery using time of the UE. A frequency domain resource occupied by the paging message is specified by the PDCCH scrambled by using the P-RNTI. In a time domain, the UE tries to receive the paging message only in a particular subframe of a particular frame in a paging period of the UE.

In step S202, in a possible implementation, the paging message carries a group identifier of a to-be-paged group, and the to-be-paged UEs belong to the to-be-paged group; the monitoring, by user equipment UE, a paging message broadcast by a base station is specifically: monitoring, by the UE, the group identifier of the to-be-paged group on a physical downlink control channel PDCCH of a downlink subframe, and monitoring the UE identifiers and the small data on a physical downlink shared channel PDSCH corresponding to the PDCCH of the downlink subframe.

Step S203: The UE determines, based on the UE identifiers, whether the UE is paged.

Specifically, based on whether a UE ID list in the paging message includes the UE identifier of the UE, the UE determines whether the UE is paged by the base station.

In a possible implementation, the determining, by the UE based on the UE identifiers, whether the UE is paged may be specifically: determining, by the UE based on the group identifier, whether the UE is in the to-be-paged group; if the UE is in the to-be-paged group, determining whether the identifier of the UE is in the to-be-paged UE identifiers; and if the identifier of the UE is in the to-be-paged UE identifiers, determining that the UE is paged. To be specific, the UE first determines whether the UE is paged. This is because only a paged UE may need to receive small data. If the UE is not paged, it is impossible that the UE needs to receive small data. That is, if the UE needs to receive small data, the UE needs to be first paged by the base station and then performs a procedure such as random access.

Step S204: If the UE is paged, when determining that the UE has small data, the UE parses and reads the small data carried by the paging message.

Specifically, when determining that the UE has small data, the UE parses and reads, in the paging message according to the preset arrangement rule agreed on in advance or a related indication message carried in the paging message, the small data sent by the base station. Whether the UE has small data is determined in a plurality of manners. For example, when the base station and the UE agree on an arrangement rule in advance, the UE may determine that the UE has small data, but whether the small data is empty needs to be further determined by the UE by parsing and reading. In addition, the UE may further determine, based on some indication information having an indication function carried in the paging message, whether the UE needs to receive small data.

In step S204, in a possible implementation, the when determining that the UE has small data, parsing and reading, by the UE, the small data carried by the paging message is specifically: calculating, by the UE according to a preset arrangement rule, a time-frequency resource location occupied by the small data corresponding to a UE identifier that is sent by the base station to the UE in the paging message;

and parsing and reading, based on the time-frequency resource location, the small data corresponding to the UE identifier of the UE. It should be noted that for details of the preset arrangement rule, refer to all implementations in step S201, and details are not described herein again.

In step S204, in a possible implementation, the paging message carries indication information used to indicate whether each of the to-be-paged UEs needs to parse and read small data. The when determining that the UE has small data, parsing and reading, by the UE, the small data carried by the paging message may be specifically: determining, by the UE based on the indication information, whether the UE has the small data; and if the UE has the small data, parsing and reading, by the UE, the small data carried in the paging message. It should be noted that the indication information in this implementation may be the second indication information in step S201, and details are not described herein again.

In step S204, in a possible implementation, the paging message carries location information of a time-frequency resource that is in the paging message and that corresponds to a UE identifier of to-be-paged UE that needs to receive small data. The parsing and reading, by the UE, the small data carried in the paging message may be specifically: searching, by the UE, for corresponding location information of a time-frequency resource based on a UE identifier of the UE, and parsing and reading the corresponding small data of the UE. It should be noted that for further details, refer to the implementation I in step S201, and details are not described herein again.

The following specifically describes various implementations of the embodiments of the present disclosure with reference to a specific frame structure on a PDSCH.

In step S201, how the paging message carries the UE identifiers of the to-be-paged UEs and the small data sent to the at least one of the to-be-paged UEs, and how the UE parses and reads the small data carried in the paging message may specifically include the following several implementations:

Implementation 1

This implementation may be included in the possible implementation A, B, C, D, E, or J in step S201 as a specific application implementation scenario, and the core thereof is directly attaching small data behind a UE ID list.

Figure 3:
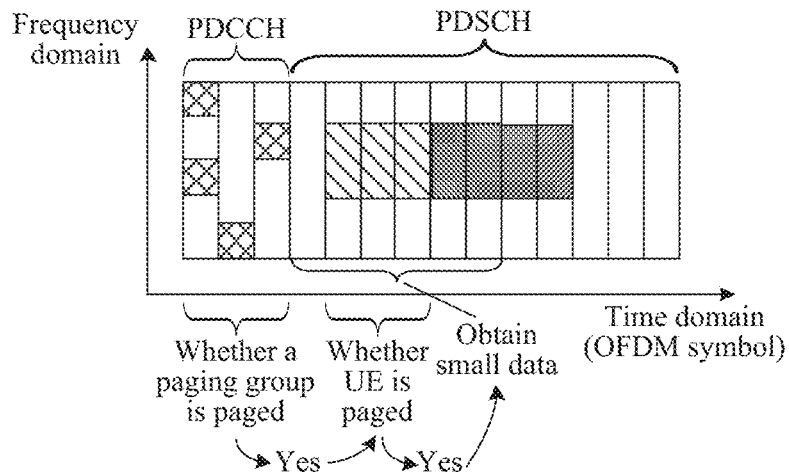
FIG. 3 is a schematic diagram of mapping of a paging message and a data packet to a time-frequency resource in implementation 1 according to an embodiment of the present disclosure.

FIG. 3 is a schematic diagram of mapping of a paging message and a data packet to a time-frequency resource in implementation 1 according to an embodiment of the present disclosure. Resource mapping in this embodiment of the present disclosure is shown in FIG. 3. A paging message is carried on a PDCCH, and a cyclic redundancy check (CRC) of the PDCCH is scrambled by using a P-RNTI. Currently, addressing of a user terminal is mainly performed by using a 16-bit RNTI (Radio Network Temporary Identity). There are a plurality of different RNTIs for different purposes, and common RNTIs are: a P-RNTI (Paging Radio Network Temporary Identity) mainly used for addressing when a paging message is scheduled; an SI-RNTI (System Information Radio Network Temporary Identity) mainly used for addressing when a system message is scheduled; and a C-RNTI (Cell Radio Network Temporary Identity) mainly used for addressing when user data is dynamically scheduled. UE monitors a PDCCH at specified time intervals. If finding that a group of the UE is paged (which is determined by using paged group information in the figure), the UE reads a UE ID list on a rear PDSCH to determine whether an ID of the UE is in the list. If the ID of the UE is in the list, it indicates that the UE is already paged. After it is determined that the UE is paged, a practice in an existing LTE system is that the paged UE needs to initiate random access, switch a state of the UE to a connected mode, and then receive downlink data.

Figure 4:
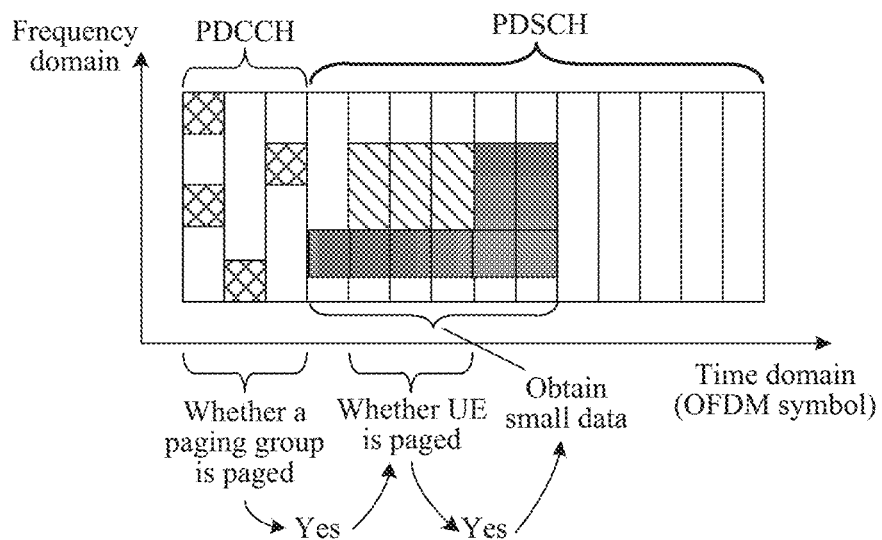
FIG. 4 is another schematic diagram of mapping of a paging message and a data packet to a time-frequency resource in implementation 1 according to an embodiment of the present disclosure.

In this embodiment of the present disclosure, data sent to all paged UEs is directly attached behind the UE ID list of the PDSCH (refer to a part marked as "small data of paged UE" in FIG. 3), and this is not mandatory, provided that a time-frequency resource (a time-frequency resource of the marked "small data of paged UE") occupied by data has a particular rule and the rule is agreed on in advance. For example, FIG. 4 is another schematic diagram of mapping of a paging message and a data packet to a time-frequency resource in implementation 1 according to an embodiment of the present disclosure. A base station and UE need to agree on a filling sequence of a time-frequency resource prepared for data. It should be noted that a quantity (refer to a horizontal coordinate) of orthogonal frequency division multiplexing (OFDM) symbols occupied by different shadows in the PDSCH part in FIG. 3 and FIG. 4 (also including the following similar figures in the embodiments of the present disclosure) is only an example.

Figure 5:
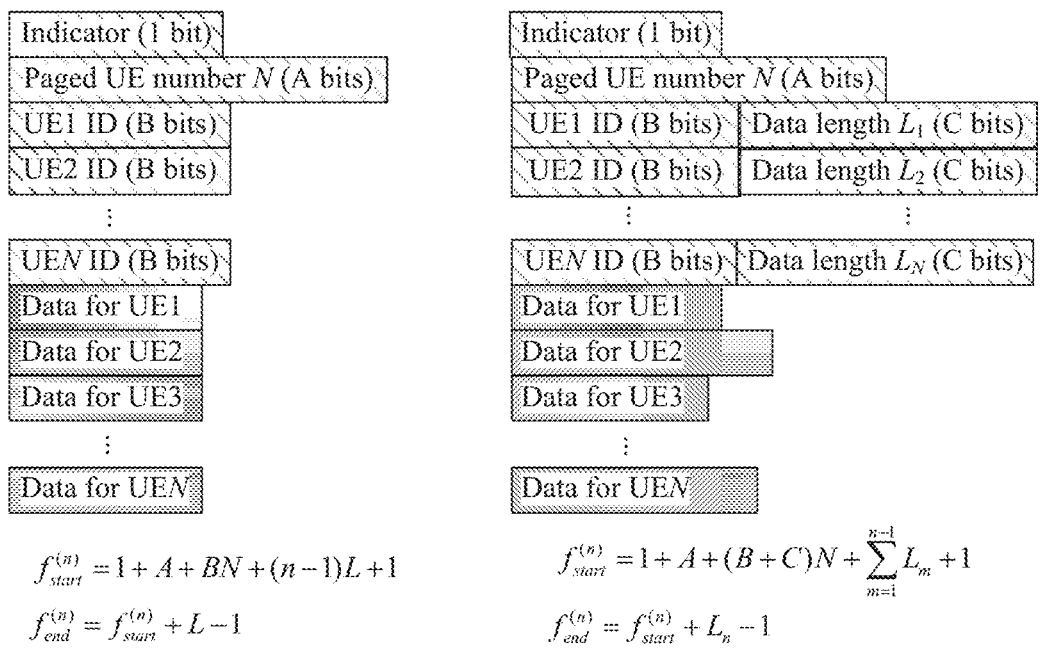
FIG. 5 is a schematic diagram of logical arrangement of bits of a paging message and a small data packet in implementation 1 according to an embodiment of the present disclosure.

The UE ID list and the data in FIG. 3 may be logically organized in the following two cases. FIG. 5 is a schematic diagram of logical arrangement of bits of a paging message and a small data packet in implementation 1 according to an embodiment of the present disclosure. In FIG. 5, a bit is transferred based on a row, and it may be agreed on that bits are transferred in a sequence from left to right in each row. To be specific, a leftmost bit is first transferred and a rightmost bit is last transferred.

Figure 6:
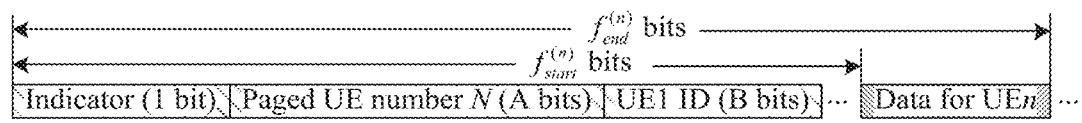
FIG. 6 is a schematic diagram of a start location and an end location of a small data packet in implementation 1 according to an embodiment of the present disclosure.

The left figure of FIG. 5 shows a resource allocation case of a paging message and a small data packet in a scenario in which all paged users have small data packets having a same length, and the right figure shows a resource allocation case of a paging message and a small data packet in a scenario in which paged users have small data packets having different lengths. In the solution in this embodiment of the present disclosure, an indicator of 1 bit is set. For example, the indicator=0 indicates that paged users have small data packets having a same length, and the indicator=1 indicates that paged users have small data packets having different lengths. A paged UE number of A bits is behind the indicator. Referring to FIG. 5, it is found that when the indicator=0, all small data packet lengths behind a paged UE ID list are L bits (the left figure of FIG. 5 is applicable to a scenario in which a length is agreed on in advance, and if a data length is variable, the following FIG. 7 may be used). When the indicator=1, the UE ID list and a small data packet length list are behind the paged UE number, and a small data packet length is behind a corresponding UE ID (certainly, the locations may be reversed). The UE calculates, based on received information, a start location and an end location (the start location and the end location herein are offsets relative to a start location of the paging message on the PDSCH) of a small data packet sent by the base station to the UE. FIG. 6 shows a start location and an end location of a small data packet according to Embodiment 1.

As shown in FIG. 5, if paged users have small data packets having a same length, $$f_{start}^{(n)}=1+A+BN+(n-1)L+1$$

$$f_{end}^{(n)}=f_{start}^{(n)}+L-1$$

$f_{start}^{(n)}$ indicates a start location (an offset relative to the start location of the paging message on the PDSCH) of a small data packet of a user n. $f_{end}^{(n)}$ indicates an end location (an offset relative to the start location of the paging message on the PDSCH) of the small data packet of the user n. There are N paged users in total. A bits are used to indicate a paged UE number, B bits are used to indicate a UE ID of a paged user, and L bits are used to indicate a small data packet length of each user. As shown in FIG. 3, if paged users have small data packets having different lengths, $$f_{start}^{(n)} = 1 + A + (B+C)N + \sum_{m=1}^{n} L_m + 1$$

$$f_{end}^{(n)} = f_{start}^{(n)} + L_n - 1,$$

where $L_n$ indicates a small data packet length of an $n^{th}$ user, and the length is indicated by C(bits).

Figure 7:
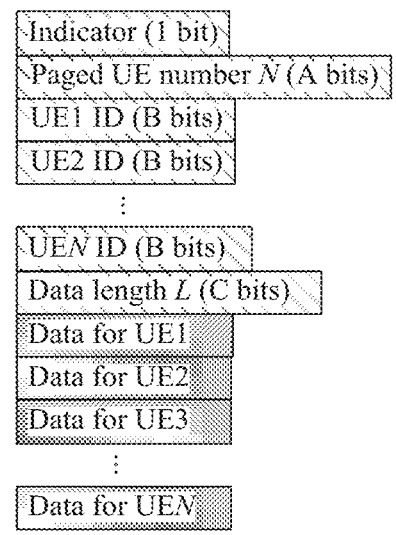
FIG. 7 is a schematic diagram of logical arrangement of bits of a paging message and a small data packet in implementation 1 according to an embodiment of the present disclosure.

If lengths of data sent to UEs are equal but are not agreed on in advance, the left figure of FIG. 5 is unsuitable, and FIG. 7 may be used in this case. FIG. 7 is a schematic diagram of logical arrangement of bits of a paging message and a small data packet in implementation 1 according to an embodiment of the present disclosure. Lengths of small data are equal but are variable, that is, the equal length is indicated in a message.

UE in an RRC_IDLE mode periodically monitors a PDCCH scrambled by using a P-RNTI. If the UE detects the PDCCH scrambled by using the P-RNTI, the UE demodulates data information on a corresponding resource block, where the data information includes a paged UE identifier UE ID. If the UE discovers that a UE identifier of the UE is consistent with a UE ID, the UE is woken up, determines, based on an indicator, whether paged users have small data packets having a same length, calculates a start location and an end location of the small data packet based on the solution in the present disclosure, and directly demodulates information about the small data packet. Otherwise, the UE discards a received paging message, and enters a sleep mode.

In this embodiment of the present disclosure, when a base station sends a small data packet to UE in an RRC_IDLE mode or an out-of-synchronization mode, a process in which the UE and the base station set up an RRC connection and the base station schedules a resource for the UE and sends data to the UE does not need to be performed. Instead, the base station packs the small data packet and the paging message together and sends the packed small data packet and paging message to the UE in the RRC_IDLE mode or the out-of-synchronization mode. This can reduce a delay when the base station sends the small data packet to the UE in the RRC_IDLE mode or the out-of-synchronization mode, and reduce signaling overheads and occupied air interface resources.

Implementation 2

The implementation 2 may be included in the possible implementation F, G, H, or J in step S201 as a specific application implementation scenario, and the core thereof is directly attaching small data behind a UE ID list.

Figure 8:
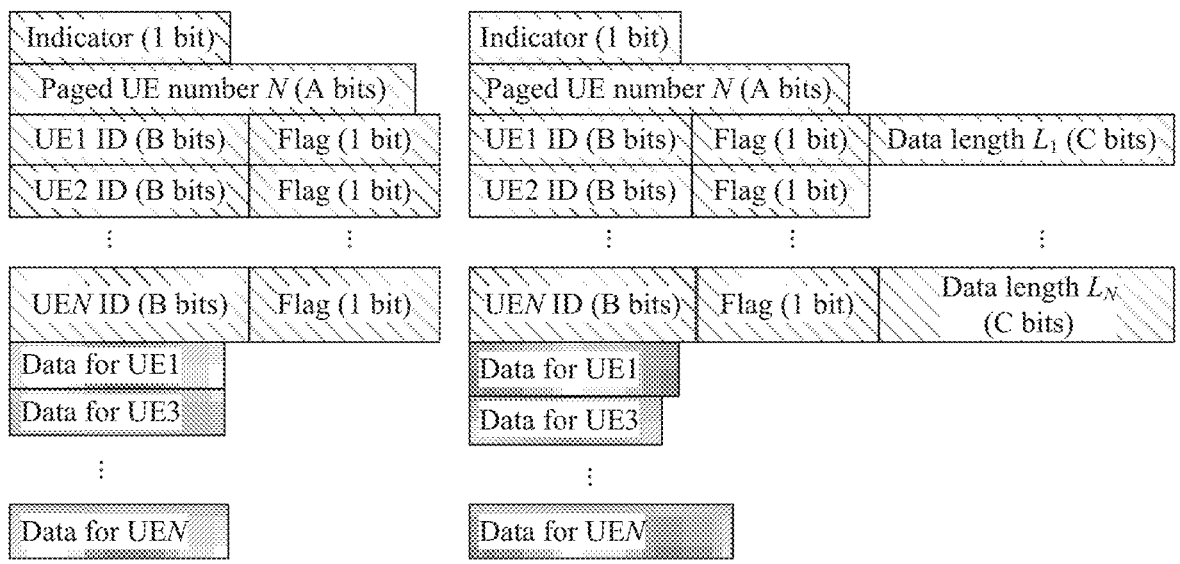
FIG. 8 is a schematic diagram of logical arrangement of bits of a paging message and a small data packet in implementation 2 according to an embodiment of the present disclosure.

In this embodiment of the present disclosure, based on Embodiment 1, a base station sends a data packet to only some paged UEs by using a paging message. In this embodiment, logical arrangement of bits of the paging message and the small data packet is shown in FIG. 8. FIG. 8 is a schematic diagram of logical arrangement of bits of a paging message and a small data packet in implementation 2 according to an embodiment of the present disclosure. The left side of FIG. 8 corresponds to a scenario in which data lengths of UEs whose data is carried in the paging message are equal, and the right side of FIG. 8 corresponds to a scenario in which data lengths are not equal. A flag of 1 bit is used to indicate whether data of UE is delivered together with the paging message. For example, a flag of 0 indicates that the data of the UE is not delivered together with the paging message, and the UE completes random access and receives the data based on a procedure of an existing system. A flag of 1 indicates that the data corresponding to the UE is attached behind the paging message. Each UE can calculate, based on flag information of all paged UEs and the like, a start bit and an end bit of data (if the data is attached behind the paging message) sent to the UE. Because data of UE2 is not delivered together with the paging message in FIG. 8, there is no "data for UE2", and the right figure does not have a data length of UE2.

In this embodiment of the present disclosure, some paged UEs need to receive a small data packet and some paged UEs need to receive a large data packet. Only a small data packet is suitably attached in the paging message (because a large data packet needs to be transferred for a plurality of times to complete transfer, and there are also many feedbacks from UE to the base station, it is suitable for the UE to switch to a connected mode based on a procedure of an existing system). This embodiment is applicable to this scenario.

An improvement of this embodiment of the present disclosure that is different from the prior art is as follows: in the prior art, all paged UEs need to perform a procedure such as random access, switch to a connected mode, and then receive data, but in this embodiment of the present disclosure, some UEs are allowed to perform a procedure that is the same as that in an existing system, and other UEs (for example, data packets sent to the UEs are relatively small) directly receive, in the paging message, the data sent to the UEs, thereby reducing a delay and power consumption.

Implementation 3

The implementation 3 may be included in the possible implementation I or J in step S201 as a specific application implementation scenario, and the core thereof is directly attaching small data behind a UE ID list.

Figure 9:
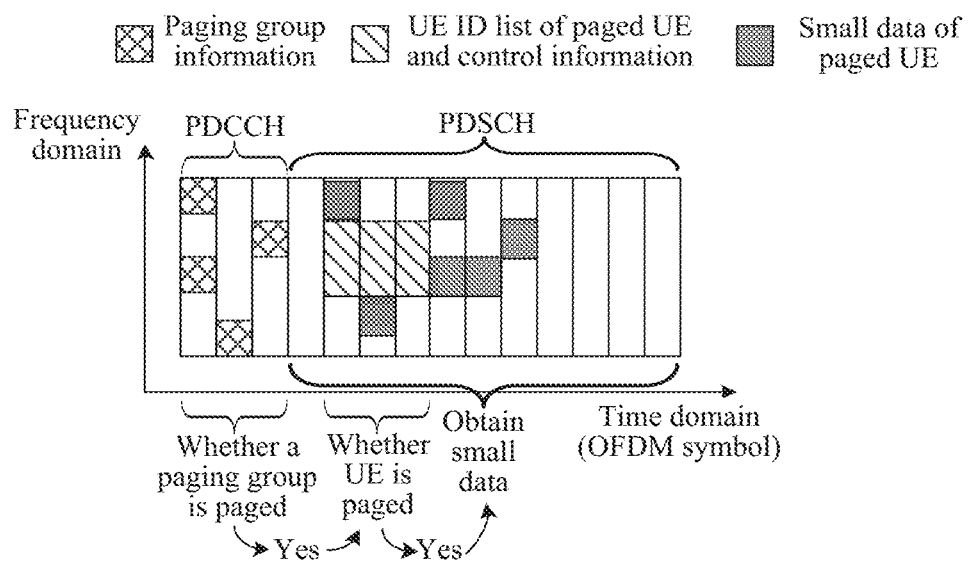
FIG. 9 is a schematic diagram of mapping of a paging message and a data packet to a time-frequency resource in implementation 3 according to an embodiment of the present disclosure.
Figure 10:
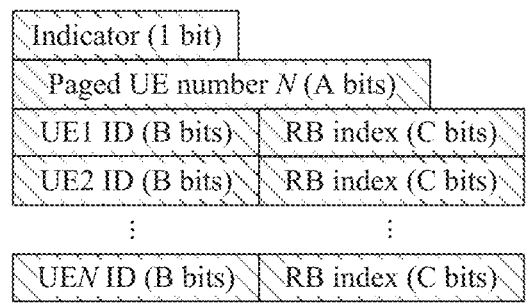
FIG. 10 is a schematic diagram of logical arrangement of bits of a paging message and a small data packet in implementation 3 according to an embodiment of the present disclosure.

In this embodiment of the present disclosure, a time-frequency resource occupied by data sent to all paged UEs is allocated by a base station and is not allocated in advance according to a particular rule. It is assumed that data in a paging message also occupies a time-frequency resource by using an RB as a unit. A time-frequency resource occupied by the paging message and carried data is shown in FIG. 9. FIG. 9 is a schematic diagram of mapping of a paging message and a data packet to a time-frequency resource in implementation 3 according to an embodiment of the present disclosure. A time-frequency resource occupied by data is indicated by an "RB index", as shown in FIG. 10. FIG. 10 is a schematic diagram of logical arrangement of bits of a paging message and a small data packet in implementation 3 according to an embodiment of the present disclosure. A range of a bracket above "obtaining small data" in FIG. 9 is larger than that in FIG. 3. This is because a time-frequency resource occupied by data may be any idle resource on a PDSCH. The range of the bracket above "obtaining small data" in FIG. 9 is an example, and does not mean that the data can be transmitted only on 11 OFDM symbols included in the bracket. The data may alternatively be transmitted on a PDSCH in a next subframe (in an LTE system, 14 OFDM symbols are 1 subframe). A technical effect of the implementation 3 is that a base station flexibly arranges, based on a status of using a downlink time-frequency resource, a time-frequency resource to transfer data sent to UE. An improvement of the implementation 3 of the present disclosure that is different from the prior art is similar to that in the implementation 1.

Implementation 4

Figure 11:
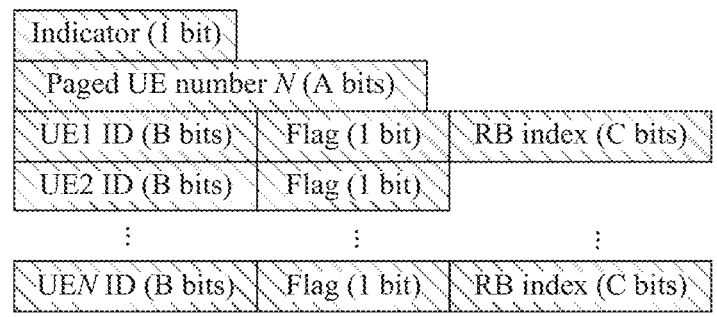
FIG. 11 is a schematic diagram of logical arrangement of bits of a paging message and a small data packet in implementation 4 according to an embodiment of the present disclosure.

In this embodiment of the present disclosure, based on Embodiment 3, a base station sends a data packet to only some paged UEs by using a paging message. FIG. 11 is a schematic diagram of logical arrangement of bits of a paging message and a small data packet in implementation 4 according to an embodiment of the present disclosure. In FIG. 11, it is assumed that data is not sent to UE2 by using a paging message.

A technical effect of Embodiment 4 is similar to that of Embodiment 2. An improvement of Embodiment 4 that is different from the prior art is similar to that in Embodiment 2, and details are not described herein again.

Implementation 5

The implementation 5 may be included in the possible implementation I or J in step S201 as a specific application implementation scenario, and the core thereof is directly attaching small data behind a UE ID list.

In this embodiment of the present disclosure, more examples of a form of organizing a paging message in an existing system and newly added information for indicating carried data (that is, slashed parts in FIG. 3, FIG. 4, and FIG. 9) on a time-frequency resource are used. The essence of this embodiment of the present disclosure is only to extend the paging message in the existing system without changing an organization structure of the paging message in the existing system.

Occupation of a time-frequency resource by a paging message in an existing LTE system is similar to that in FIG. 3, only the part marked as "small data of paged UE" in the figure does not exist, and content included in the part marked as "UE ID list of paged UE and control information" in the figure is not as simple as that described in the same shadow parts in FIG. 8, FIG. 10, and FIG. 11 and instead details are stipulated in the communication protocol 36.331. In this embodiment of the present disclosure, the paging message (including content transferred on a PDCCH) in the existing system is not changed. In this way, the content shown in FIG. 8, FIG. 10, and FIG. 11 needs to be adjusted, to delete "flag", "data length", and the like that do not exist in the 36.331 protocol.

Figure 12:
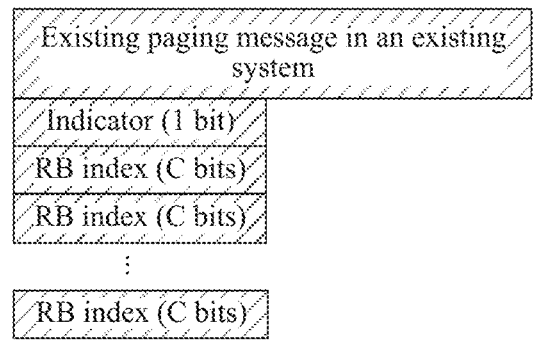
FIG. 12 is a schematic diagram of arrangement of an extended paging message based on an existing system paging message according to an embodiment of the present disclosure.
Figure 13:
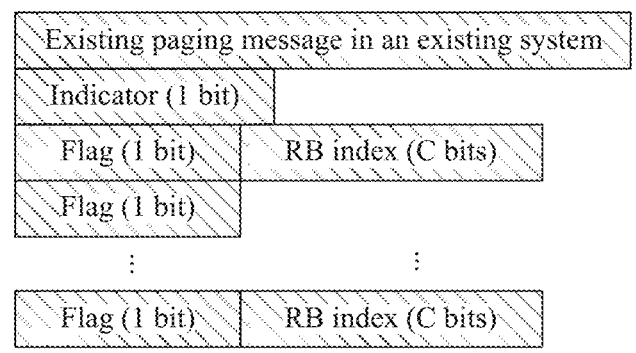
FIG. 13 is another schematic diagram of an extended paging message based on an existing system paging message according to an embodiment of the present disclosure.
Figure 14:
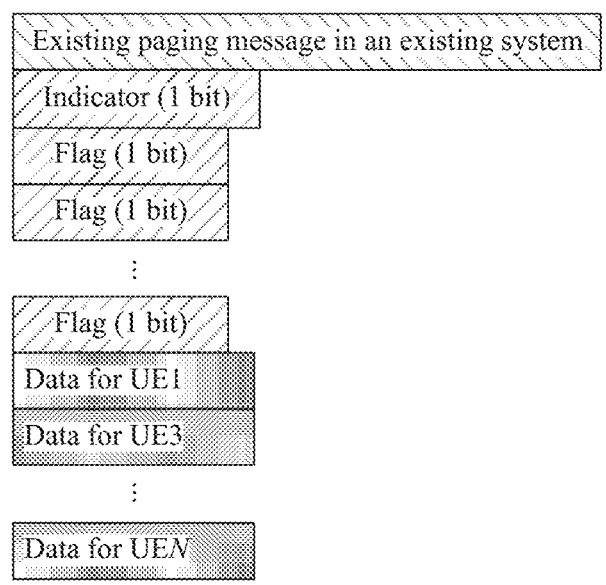
FIG. 14 is another schematic diagram of arrangement of an extended paging message based on an existing system paging message according to an embodiment of the present disclosure.
Figure 15:
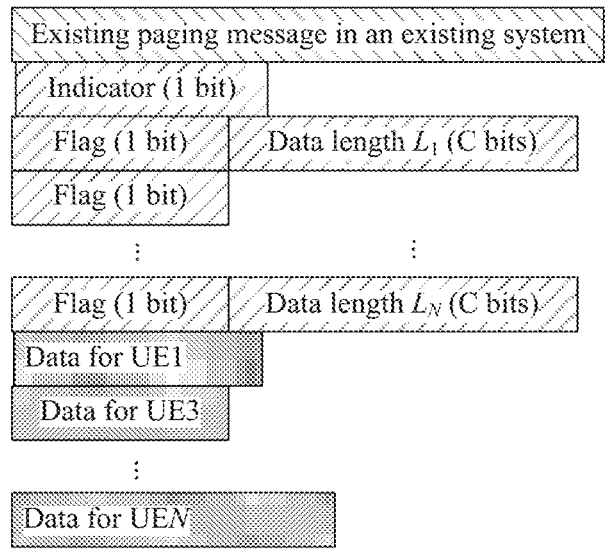
FIG. 15 is another schematic diagram of arrangement of an extended paging message based on an existing system paging message according to an embodiment of the present disclosure.
Figure 16:
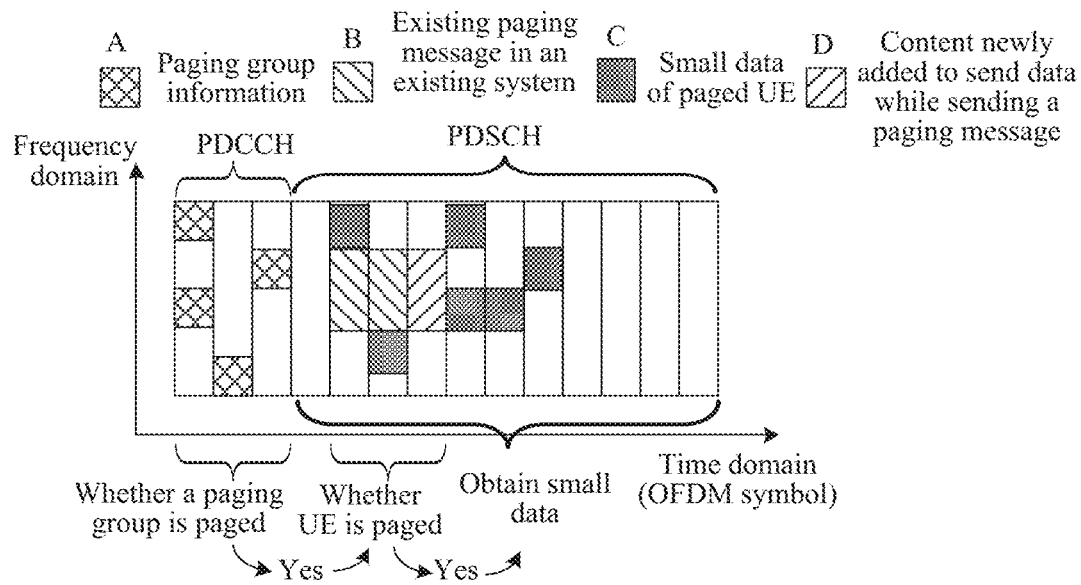
FIG. 16 is a schematic diagram of mapping of a paging message and a data packet to a time-frequency resource according to an embodiment of the present disclosure.
Figure 17:
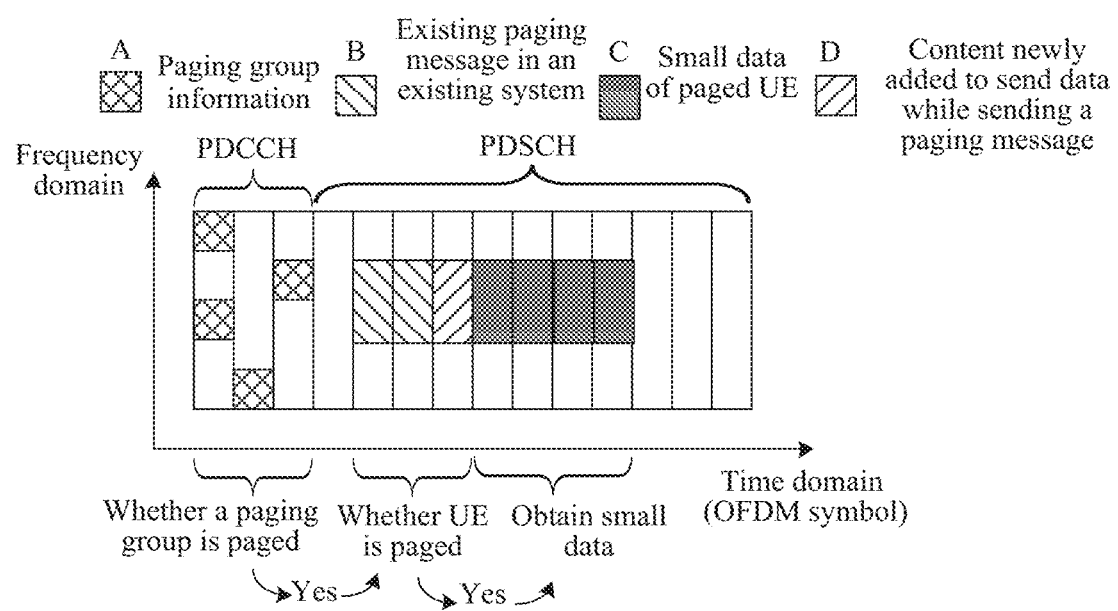
FIG. 17 is another schematic diagram of mapping of a paging message and a data packet to a time-frequency resource according to an embodiment of the present disclosure.
Figure 18:
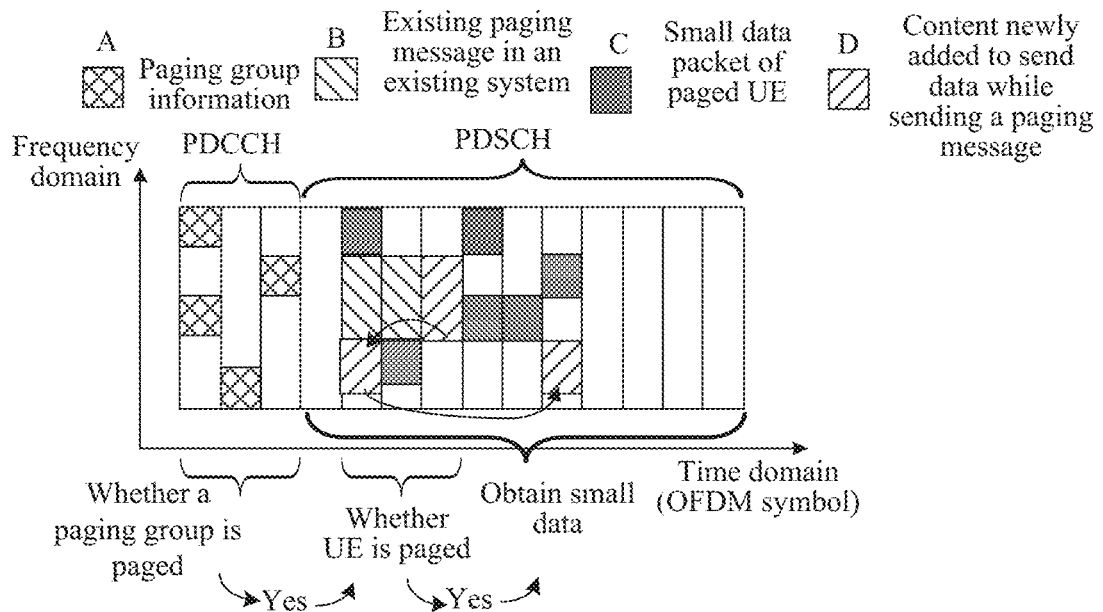
FIG. 18 is still another schematic diagram of mapping of a paging message and a data packet to a time-frequency resource according to an embodiment of the present disclosure.

An adjusted paging message may be shown in FIG. 12 to FIG. 15. FIG. 12 is a schematic diagram of arrangement of an extended paging message based on an existing system paging message according to an embodiment of the present disclosure. A core thereof is to directly send data to all paged UEs, and a time-frequency resource of the data is indicated by an RB index. FIG. 13 is another schematic diagram of an extended paging message based on an existing system paging message according to an embodiment of the present disclosure. A core thereof is to directly send data to some paged UEs, and a time-frequency resource of the data is indicated by an RB index. FIG. 14 is another schematic diagram of arrangement of an extended paging message based on an existing system paging message according to an embodiment of the present disclosure. A core thereof is to directly send data to all paged UEs, and a time-frequency resource of the data is selected in a manner agreed on in advance. FIG. 15 is another schematic diagram of arrangement of an extended paging message based on an existing system paging message according to an embodiment of the present disclosure. A core thereof is to directly send data to some paged UEs, and a time-frequency resource of the data is selected in a manner agreed on in advance. FIG. 16 is a schematic diagram of mapping of a paging message and a data packet to a time-frequency resource according to an embodiment of the present disclosure. A core thereof is to extend a paging message in an existing system, and a time-frequency resource of the data is indicated by an RB index. FIG. 17 is another schematic diagram of mapping of a paging message and a data packet to a time-frequency resource according to an embodiment of the present disclosure. A core thereof is to extend a paging message in an existing system, and a time-frequency resource of the data is agreed on in advance. FIG. 18 is still another schematic diagram of mapping of a paging message and a data packet to a time-frequency resource according to an embodiment of the present disclosure. A core thereof is that a data length of an extended paging message is indeterminate. Two shadows having different directions in FIG. 12 to FIG. 15 are used to distinguish content of an existing paging message in an existing system and newly added content.

FIG. 12 is adjusted based on FIG. 10. FIG. 13 is adjusted based on FIG. 11. FIG. 14 is adjusted based on the left figure of FIG. 8. FIG. 15 is adjusted based on the right figure of FIG. 8. A UE sequence corresponding to an "RB index" or a "flag" newly added to the paging message is the same as that in a UE ID list in an "existing paging message in an existing system". Corresponding to FIG. 12 and FIG. 13, an example of mapping of a paging message and a data packet to a time-frequency resource is shown in FIG. 16. Corresponding to FIG. 14 and FIG. 15, an example of mapping of a paging message and a data packet to a time-frequency resource is shown in FIG. 17. In the figure, a quantity of OFDM symbols occupied by different shadows on a PDSCH is only an example. In FIG. 16, a time-frequency resource occupied by an area B is indicated by an area A. This practice is used in an existing LTE system. A time-frequency resource used for an area D and a time-frequency resource used for the area B conform to a particular rule, and new UE and a base station need to agree in advance. In FIG. 16, a time-frequency resource used for the area D and a time-frequency used for the area B have a same frequency (that is, a same subcarrier is used), and the area D and the area B are adjacent to each other in time (that is, a first OFDM symbol of the area D and a last OFDM symbol of the area B are adjacent to each other). A quantity of OFDM symbols occupied by the area D in time also needs to be stipulated in advance. The time-frequency resource used for the area D may alternatively not be related to the time-frequency resource used for the area B. For example, a fixed area in a time-frequency resource of each subframe is used to transmit the area D. In conclusion, a time-frequency resource specifically selected for the area D is not limited in the present disclosure, provided that it is ensured that novel UE (that is, UE that can receive data delivered together with the paging message) can find the area D.

In FIG. 16, a relatively large area D may be needed, or a size of the area D is indeterminate (for example, a quantity of UEs whose data is delivered together with the paging message affects the size of the area D). It is improper to agree on the size of the area D in advance. In a solution, a size of a part of the area D is agreed on in advance. If the area D exceeds the part agreed on in advance, indication information in the end of the area D indicates time-frequency resources on which a next part of the area D is located. The next part of the area D may also continue to indicate a following part of the area D. This example is shown in FIG. 18.

Technical effects of Embodiment 5 in the solutions of the present disclosure are as follows: using of an old terminal (that is, a terminal that cannot receive, based on an existing communication protocol, data carried in a paging message) in a new system (a communications system that may add data to the paging message) is not affected. A new terminal (a terminal that can receive data in the paging message based on an extended communication protocol) can receive data delivered together with the paging message (if the data is delivered together with the paging message). The new terminal can also receive data based on a procedure of an existing system. An improvement of Embodiment 5 that is different from the prior art is as follows: the new terminal can receive data delivered together with the paging message without affecting a paging operation on the old terminal.

The embodiments of the present disclosure are used as relatively specific designs, and any design developed from the designs (for example, an arrangement sequence of different content in a paging message is changed, and locations of a "UE ID" and a "flag" in a same row in FIG. 8 are exchanged) shall be considered as falling within the protection scope of the present disclosure. In the embodiments of the present disclosure, only an OFDM is used as an example, but an air interface technology is not limited in the present disclosure, and any air interface technology having a time-frequency structure falls within the scope of the present disclosure.

In the embodiments of the present disclosure, the base station broadcasts the paging message, where the paging message carries the UE identifiers of the to-be-paged user equipments UEs and the small data sent to the at least one of the to-be-paged UEs, and the small data is data whose data volume is less than the preset data volume threshold. In this embodiment of the present disclosure, while the base station pages to-be-paged UE, small data may be conveniently sent to the UE that needs to receive the small data. In this way, the small data may be quickly sent to the corresponding to-be-paged UE, and communication costs required by the UE to receive the small data can be reduced. In comparison with the prior art in which before receiving the small data sent by the base station, the UE needs to complete a complex procedure such as random access and switching to a connected mode after receiving the paging message, signaling and time overheads for sending the small data are reduced and communication efficiency is improved.

Figure 19:
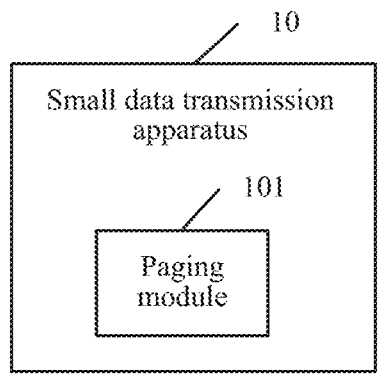
FIG. 19 is a schematic structural diagram of a small data transmission apparatus according to an embodiment of the present disclosure.

An embodiment of the present disclosure further provides a small data transmission apparatus 10. FIG. 19 is a schematic structural diagram of a small data transmission apparatus 10 according to an embodiment of the present disclosure. The following describes a structure of the small data transmission apparatus 10 in detail with reference to FIG. 19. The apparatus 10 may include: a paging module 101.

The paging module 101 is configured to broadcast a paging message, where the paging message carries UE identifiers of to-be-paged user equipments UEs and small data sent to at least one of the to-be-paged UEs, and the small data is data whose data volume is less than a preset data volume threshold.

Specifically, the paging module 101 is specifically configured to: arrange, add, and broadcast the UE identifiers and the small data in the paging message according to a preset arrangement rule.

Further, the paging message carries UE identifiers of to-be-paged N UEs and small data sent to the to-be-paged N UEs, and N is an integer greater than 0; and the paging module 101 is specifically configured to: arrange the small data of the to-be-paged N UEs based on an arrangement sequence of the UE identifiers of the to-be-paged N UEs in the paging message, and add the arranged small data of the to-be-paged N UEs to the paging message for broadcasting.

Further, data lengths of the small data of the to-be-paged N UEs are consistent.

Further, data lengths of the small data of the to-be-paged N UEs are inconsistent, the paging message further carries first indication information, and the first indication information is used to indicate data length information of the small data respectively corresponding to the to-be-paged N UEs.

Further, the paging message carries UE identifiers of to-be-paged N UEs, second indication information used to indicate that M of the to-be-paged N UEs need to receive corresponding small data, and the small data sent to the to-be-paged M UEs, both N and M are integers greater than 0, and N is greater than M; and the paging module 101 is specifically configured to: arrange the small data of the to-be-paged M UEs based on an arrangement sequence of the UE identifiers of the to-be-paged M UEs in the paging message, and add the arranged small data of the to-be-paged M UEs to the paging message for broadcasting.

Further, data lengths of the small data of the to-be-paged M UEs are consistent.

Further, data lengths of the small data of the to-be-paged M UEs are inconsistent, the paging message further carries first indication information, and the first indication information is used to indicate data length information of the small data respectively corresponding to the to-be-paged M UEs.

Further, the paging message carries location information of time-frequency resources that are in the paging message and that correspond to the UE identifiers of the to-be-paged UEs that need to receive small data, and the location information of the time-frequency resources is used by the UEs to parse and read corresponding small data of the UEs based on the UE identifiers of the UEs and the location information of time-frequency resources.

Further, a time-frequency resource block occupied by the small data is an idle time-frequency resource block other than a time-frequency resource block occupied by the UE identifiers of the to-be-paged UEs in the paging message.

It may be understood that for functions of the modules of the small data transmission apparatus 10, correspondingly refer to specific implementations in the method embodiments in FIG. 1 to FIG. 18, and details are not described herein again.

In this embodiment, the small data transmission apparatus 10 is presented in a form of a module. The "module" herein may be an application-specific integrated circuit (ASIC), a processor executing one or more software or firmware programs, a memory, an integrated logical circuit, and/or another device that may provide the foregoing function. In addition, the paging module 101 may be implemented by using a processor 301 of a terminal device shown in FIG. 21.

Figure 20:
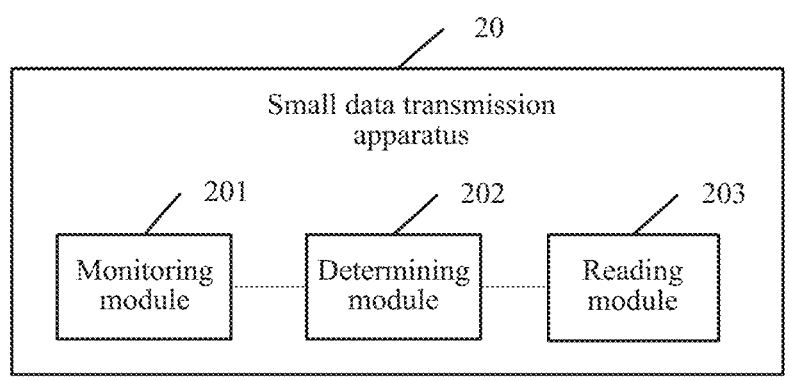
FIG. 20 is a schematic structural diagram of another small data transmission apparatus according to an embodiment of the present disclosure.

An embodiment of the present disclosure further provides another small data transmission apparatus 20, as shown in FIG. 20. FIG. 20 is a schematic structural diagram of another small data transmission apparatus according to an embodiment of the present disclosure. The following describes a structure of the small data transmission apparatus 20 in detail with reference to FIG. 20. The apparatus 20 may include: a monitoring module 201, a determining module 202, and a reading module 203.

The monitoring module 201 is configured to monitor a paging message broadcast by a base station, where the paging message carries UE identifiers of to-be-paged user equipments UEs and small data sent to at least one of the to-be-paged UEs, and the small data is data whose data volume is less than a preset data volume threshold.

The determining module 202 is configured to determine, based on the UE identifiers, whether the UE is paged.

The reading module 203 is configured to: if a determining result is yes, when the UE determines that the UE has small data, parse and read the small data carried by the paging message.

Specifically, the reading module 203 includes:

a calculation unit, configured to calculate, according to a preset arrangement rule, a time-frequency resource location occupied by the small data corresponding to a UE identifier that is sent by the base station to the UE in the paging message; and a first reading unit, configured to: parse and read, based on the time-frequency resource location, the small data corresponding to the UE identifier of the UE.

Further, the paging message carries indication information used to indicate whether each of the to-be-paged UEs needs to parse and read small data.

The reading module 203 includes:

a determining unit, configured to determine, based on the indication information, whether the UE has the small data; and a second reading unit, configured to: if the UE has the small data, parse and read, by the UE, the small data carried in the paging message.

Further, the paging message carries location information of time-frequency resources that are in the paging message and that correspond to the UE identifiers of the to-be-paged UEs that need to receive small data; and the reading module 203 is configured to: when determining that the UE has the small data, search for corresponding location information of a time-frequency resource based on a UE identifier of the UE, and parse and read the corresponding small data of the UE.

It may be understood that for functions of the modules of the small data transmission apparatus 10, correspondingly refer to specific implementations in the method embodiments in FIG. 1 to FIG. 18, and details are not described herein again.

In this embodiment, the small data transmission apparatus 10 is presented in a form of a module. The "module" herein may be an application-specific integrated circuit (application-specific integrated circuit, ASIC), a processor executing one or more software or firmware programs, a memory, an integrated logical circuit, and/or another device that may provide the foregoing function. In addition, the monitoring module 201, the determining module 202, and the reading module 203 may be implemented by using a processor 401 of a terminal device shown in FIG. 22.

Figure 21:
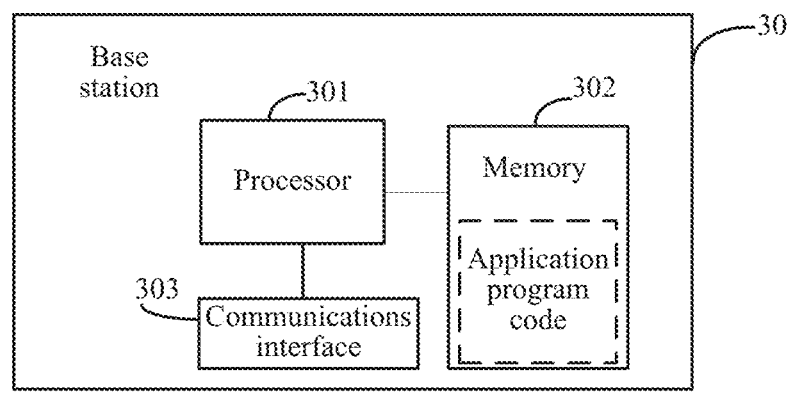
FIG. 21 is a schematic structural diagram of a base station according to an embodiment of the present disclosure.

An embodiment of the present disclosure further provides a base station 30, as shown in FIG. 21. FIG. 21 is a schematic structural diagram of a base station according to an embodiment of the present disclosure. The following describes a structure of the base station 30 in detail with reference to FIG. 21. The base station 30 includes at least one processor 301, at least one memory 302, and at least one communications interface 303. The processor 301, the memory 302, and the communications interface 303 are connected and communicate with each other by using the communications bus.

The processor 301 may be a general purpose central processing unit (CPU), a microprocessor, an application-specific integrated circuit (ASIC), or one or more integrated circuits configured to control program execution in the foregoing solution. The communications interface 303 is configured to communicate with another device or a communications network such as the Ethernet, a radio access network (RAN), or a wireless local area network (WLAN).

The memory 302 may be a read-only memory (ROM) or another type of static storage device that can store static information and a static instruction; or a random access memory (RAM) or another type of dynamic storage device that can store information and an instruction; or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store expected program code in a form of an instruction or a data structure and that is accessible to a computer, but is not limited thereto. The memory may independently exist and be connected to the processor by using the bus. Alternatively, the memory may be integrated with the processor.

The memory 302 is configured to store application program code for executing the foregoing solution, and the execution is controlled by the processor 301. The processor 301 is configured to execute the application program code stored in the memory 302.

The code stored in the memory 302 may be used to perform the foregoing small data transmission method performed by the base station in FIG. 1 to FIG. 18. For example, a paging message is broadcast, where the paging message carries UE identifiers of to-be-paged user equipments UEs and small data sent to at least one of the to-be-paged UEs, and the small data is data whose data volume is less than a preset data volume threshold. In further detail, for functions of modules and components of the base station 30, correspondingly refer to specific implementations of the base station in the method embodiments in FIG. 1 to FIG. 18, and details are not described herein again.

Figure 22:
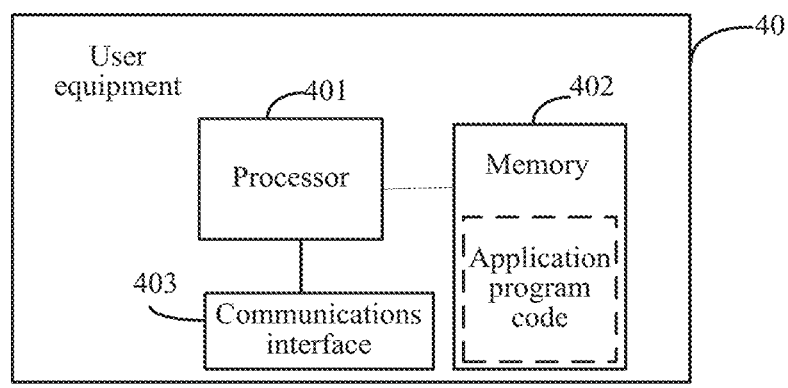
FIG. 22 is a schematic structural diagram of user equipment according to an embodiment of the present disclosure.

An embodiment of the present disclosure further provides user equipment 40, as shown in FIG. 22. FIG. 22 is a schematic structural diagram of user equipment according to an embodiment of the present disclosure. The following describes a structure of the user equipment 40 in detail with reference to FIG. 22. The user equipment 40 includes at least one processor 401, at least one memory 402, and at least one communications interface 403. The processor 401, the memory 402, and the communications interface 403 are connected and communicate with each other by using the communications bus.

The processor 401 may be a general purpose central processing unit (CPU), a microprocessor, an application-specific integrated circuit (ASIC), or one or more integrated circuits configured to control program execution in the foregoing solution.

The communications interface 403 is configured to communicate with another device or a communications network such as the Ethernet, a radio access network (RAN), or a wireless local area network (WLAN).

The memory 402 may be a read-only memory (ROM) or another type of static storage device that can store static information and a static instruction; or a random access memory (RAM) or another type of dynamic storage device that can store information and an instruction; or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store expected program code in a form of an instruction or a data structure and that is accessible to a computer, but is not limited thereto. The memory may independently exist and be connected to the processor by using the bus. Alternatively, the memory may be integrated with the processor.

The memory 402 is configured to store application program code for executing the foregoing solution, and the execution is controlled by the processor 401. The processor 401 is configured to execute the application program code stored in the memory 402.

The code stored in the memory 402 may be used to perform the foregoing small data transmission method performed by the user equipment in FIG. 1 to FIG. 18. For example, a paging message broadcast by a base station is monitored, where the paging message carries UE identifiers of to-be-paged user equipments UEs and small data sent to at least one of the to-be-paged UEs, and the small data is data whose data volume is less than a preset data volume threshold.

The UE determines, based on the UE identifiers, whether the UE is paged; and if the UE is paged, when determining that the UE has small data, the UE parses and reads the small data carried by the paging message. In further detail, for functions of modules and components of the user equipment 40, correspondingly refer to specific implementations of the user equipment UE in the method embodiments in FIG. 1 to FIG. 18, and details are not described herein again.

Figure 23:
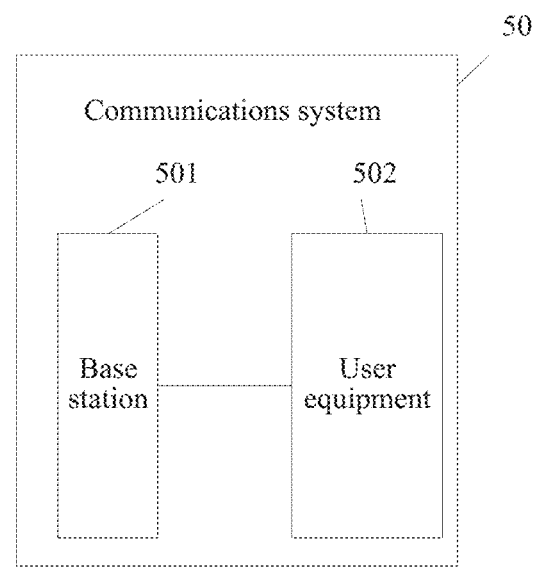
FIG. 23 is a schematic structural diagram of a communications system according to an embodiment of the present disclosure.

FIG. 23 is a schematic structural diagram of a communications system according to an embodiment of the present disclosure. The system 50 includes a base station and user equipment UE.

The base station 501 may be the base station 30 in the embodiment in FIG. 21; and the user equipment 502 may be the user equipment 40 in the embodiment in FIG. 22. It may be understood that the system 40 in this embodiment of the present disclosure may further include devices such as a core network, a routing device, an exchanging device, and a service center.

It may be understood that for functions of the base station 501 and the user equipment 502 in the system 50, correspondingly refer to specific implementations of the base station and the UE in the method embodiments in FIG. 1 to FIG. 18, and details are not described herein again.

Figure 24:
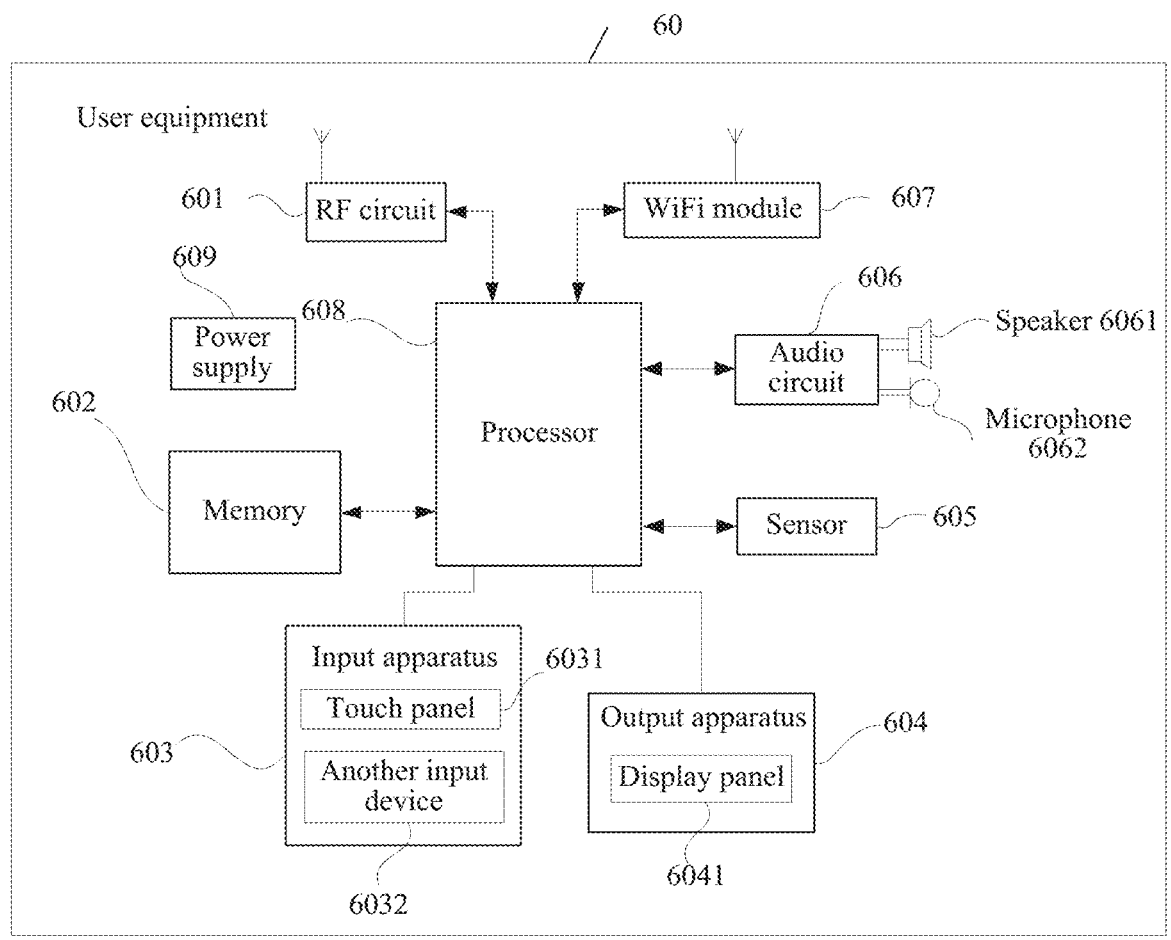
FIG. 24 is a schematic structural diagram of another embodiment of user equipment according to an embodiment of the present disclosure.

FIG. 24 is a schematic structural diagram of another embodiment of user equipment according to an embodiment of the present disclosure. The user equipment 60 may be a smart mobile terminal (for example, a mobile phone), and the user equipment 60 includes components such as a radio frequency (RF) circuit 601, a memory 602 storing one or more computer programs, an input apparatus 603, an output apparatus 604, a sensor 605, an audio circuit 606, a wireless fidelity (Wi-Fi) module 607, a processor 608 including one or more processing cores, and a power supply 603. A person skilled in the art may understand that, a structure of the user equipment shown in FIG. 24 does not limit the user equipment, which may include more or fewer components than those shown in the figure, or some components may be combined, or a different component deployment may be used.

The RF circuit 601 may be configured to receive and send a signal during an information receiving and sending process or a call process. Particularly, the RF circuit receives downlink information from a base station, then delivers the downlink information to one or more processors 608 for processing, and sends related uplink data to the base station. Generally, the RF circuit 601 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 601 may also communicate with a network or another user equipment by using wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, a short messaging service (SMS), and the like.

The memory 602 may be configured to store a computer program and a module. The processor 608 runs the computer program and the module stored in the memory 602, to implement various functional applications and data processing. The memory 602 may mainly include a program storage area and a data storage area. The program storage area may store an operating system, an application program required by at least one function (such as a sound playback function and an image display function), and the like. The data storage area may store data (such as a taken picture, audio data, video data, and obtained user status information described in this embodiment of the present disclosure) created according to use of the user equipment 60, and the like. In addition, the memory 602 may include a high speed random access memory, and may further include a nonvolatile memory, such as at least one magnetic disk storage device, a flash memory, or another volatile solid-state storage device. Correspondingly, the memory 602 may further include a memory controller, to provide access of the processor 608 and the input unit 603 to the memory 602.

The input apparatus 603 may be configured to receive input digit or character information, and generate a keyboard, mouse, joystick, optical, or track ball signal input related to user setting and function control. Specifically, the input apparatus 603 may include a touch-sensitive surface 6031 and another input device 6032. The touch-sensitive surface 6031, which may also be referred to as a touch display screen or a touch panel, may collect a touch operation of a user on or near the touch-sensitive surface (such as an operation of a user on or near the touch-sensitive surface 6031 by using any suitable object or attachment, such as a finger or a touch pen), and drive a corresponding connection apparatus according to a preset program. Optionally, the touch-sensitive surface 6031 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 608. Moreover, the touch controller can receive and execute a command sent from the processor 608. In addition, the touch-sensitive surface 6031 may be implemented by using a type such as a resistive, capacitive, infrared, or surface sound wave type. In addition to the touch-sensitive surface 6031, the input apparatus 603 may further include the other input device 6032. Specifically, the other input device 6032 may include, but is not limited to, one or more of a physical keyboard, a functional key (such as a volume control key or a switch key), a trackball, a mouse, and a joystick.

The output apparatus 604 may be configured to display information input by the user or information provided for the user, and various graphical user interfaces of the user equipment 60. The graphical user interfaces may be formed by a graph, text, an icon, a video, or any combination thereof. The output apparatus 604 may include a display panel 6041. Optionally, the display panel 6041 may be configured by using a liquid crystal display (LCD), an organic light-emitting diode (OLED), or the like. Further, the touch panel 6031 may cover the display panel 6041. After detecting a touch operation on or near the touch panel 6031, the touch panel 6031 transfers the touch operation to the processor 608 to determine a type of a touch event. The processor 608 then provides a corresponding visual output on the display panel 6041 based on the type of the touch event. Although, in FIG. 24, the touch-sensitive surface 6031 and the display panel 6041 are used as two separate parts to implement input and output functions, in some embodiments, the touch-sensitive surface 6031 and the display panel 6041 may be integrated to implement the input and output functions.

The user equipment 60 may further include at least one sensor 605, such as a distance sensor, an optical sensor, a motion sensor, and other sensors. Specifically, the distance sensor is configured to detect a distance between the screen of the user equipment and an object covering the user equipment, and the optical sensor is configured to detect an optical signal in an external environment of the user equipment. As one type of motion sensor, a gravity acceleration sensor may detect magnitude of accelerations in various directions (usually on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor may be configured in the node device 60, and details are not described herein.

The audio circuit 606, a speaker 6061, and a microphone 6062 may provide audio interfaces between the user and the user equipment 60. The audio circuit 606 may convert received audio data into an electric signal and transmit the electric signal to the speaker 6061. The speaker 6061 converts the electric signal into a sound signal for output. On the other hand, the microphone 6062 converts a collected sound signal into an electric signal. The audio circuit 606 receives the electric signal and converts the electric signal into audio data, and outputs the audio data to the processor 608 for processing. Then, the processor 180 sends the audio data to, for example, another node device by using the RF circuit 601, or outputs the audio data to the memory 602 for further processing. The audio circuit 606 may further include an earplug jack, to provide communication between a peripheral earphone and the user equipment 60.

Wi-Fi is a short-distance wireless transmission technology. The user equipment 60 may help, by using the Wi-Fi module 607, the user to receive and send emails, browse a web page, access streaming media, and so on, which provides wireless broadband Internet access for the user. Although FIG. 24 shows the Wi-Fi module 607, it may be understood that the Wi-Fi module 607 is not a necessary component of the user equipment 60, and when required, the Wi-Fi module 607 may be omitted, provided that the scope of the essence of the present disclosure is not changed.

The processor 608 is a control center of the user equipment 60, and connects to various parts of the entire user equipment 60 by using various interfaces and lines. By running or executing the computer program and/or module stored in the memory 602, and invoking data stored in the memory 602, the processor 608 performs various functions and data processing of the user equipment 60, thereby performing overall monitoring on the user equipment 60. Optionally, the processor 608 may include the one or more processing cores. Preferably, the processor 608 may integrate an application processor and a modem. The application processor mainly processes an operating system, a user interface, an application program, and the like. The modem mainly processes wireless communication. It may be understood that the foregoing modem processor may alternatively not be integrated into the processor 608.

The user equipment 60 further includes the power supply 603 (for example, a battery) that supplies power to various components. Preferably, the power supply may be logically connected to the processor 608 by using a power management system, so as to implement a function such as charging, discharging, and power consumption management by using the power management system. The power supply 603 may further include one or more of a direct current or alternating current power supply, a re-charging system, a power failure detection circuit, a power supply converter or inverter, a power supply state indicator, and any other components.

Although not shown, the user equipment 60 may further include a camera, a Bluetooth module, and the like, and details are not described herein again. Specifically, in this embodiment of the present disclosure, the output apparatus 604 (or the input apparatus 603) of the user equipment is a touchscreen display. The user equipment 60 further includes the memory 602, the processor 608, and one or more computer programs. The one or more computer programs are stored in the memory 602. The processor 608 is configured to invoke the program for small data transmission stored in the memory 602 (a non-volatile memory), to perform the procedure of the steps of the methods in the method embodiments, and details are not described herein again.

The embodiments of the present disclosure further provide a computer storage medium. The computer storage medium may store a program, and when the program is executed, at least some or all of the steps of any method in the foregoing small data transmission method embodiments may be performed.

Although the present disclosure is described with reference to the embodiments, in a process of implementing the present disclosure that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may also use another allocation form, such as by using the Internet or another wired or wireless telecommunications system.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Although the present disclosure is described with reference to specific features and the embodiments thereof, obviously, various modifications and combinations may be made to them without departing from the spirit and scope of the present disclosure. Correspondingly, the specification and accompanying drawings are merely example description of the present disclosure defined by the accompanying claims, and is considered as any of or all modifications, variations, combinations or equivalents that cover the scope of the present disclosure. Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A small data transmission method, comprising:
   identifying, by a base station, N to-be paged user equipment (UEs) for a paging message broadcast, wherein N is an integer greater than 1;
   determining, by the base station, M to-be-paged UEs within the N to-be-paged UEs for receiving small data, wherein M is an integer greater than 0 but less than N;
   determining, by the base station, a preset arrangement rule agreed upon between the base station and the N to-be-paged UEs;
   arranging, by the base station, the small data of the M to-be-paged UEs based on an arrangement sequence of user equipment (UE) identifiers of the M to-be-paged UEs in the paging message, and adding the arranged small data of the M to-be-paged UEs to the paging message for broadcasting; and
   broadcasting, by the base station, the paging message, wherein the paging message comprises:
   UE identifiers of the N to-be-paged UEs; second identification information indicating the M to-be-paged UEs to receive the small data; and
   the arranged small data for only the M to-be-paged UEs, wherein the arranged small data is data with data volume less than a preset data volume threshold.

2. The method according to claim 1, further comprising: broadcasting, by the base station, the UE identifiers of the N to-be-paged UEs and the arranged small data in the paging message according to the preset arrangement rule.

3. The method according to claim 1, wherein the arrangement sequence of the UE identifiers of the M to-be-paged UEs in the paging message comprises:
   an descending order of the UE identifiers of the M to-be-paged UEs; or
   an ascending order of the UE identifiers of the M to-be-paged UEs.

4. The method according to claim 3, wherein data lengths of the arranged small data of the M to-be-paged UEs are equal.

5. The method according to claim 3, wherein data lengths of the arranged small data of the M to-be-paged UEs are not-equal, and the paging message further comprises first indication information for indicating data length information of the arranged small data, respectively, corresponding to the M to-be-paged UEs.

6. The method according to claim 1, wherein the paging message further comprises location information of time-frequency resources that correspond to the UE identifiers of the M to-be-paged UEs, wherein the location information of the time-frequency resources enables the M to-be-paged UEs to each parse and read corresponding arranged small data of the M to-be-paged UEs.

7. The method according to claim 6, wherein a time-frequency resource block occupied by the arranged small data is an idle time-frequency resource block other than a time-frequency resource block occupied by the UE identifiers of the M to-be-paged UEs in the paging message.

8. A small data transmission method, comprising:
   determining by a user equipment (UE), a preset arrangement rule agreed upon between a base station and the UE;

monitoring, by the UE, a paging message broadcast by the base station, wherein the paging message comprises:
a list of UE identifiers of N to-be-paged user equipment (UEs), wherein N is an integer greater than 1;
second identification information indicating M of the N to-be-paged UEs, wherein M is an integer greater than 0 and N is greater than M; and
small data for each of the M to-be-paged UEs, wherein the small data:
is data with data volume less than a preset data volume threshold; and
arranged based on an arrangement sequence of the UE identifiers of the M to-be-paged UEs in the paging message;
determining, based on the list of the UE identifiers of N to-be-paged UEs in the paging message, whether the UE is paged; and
in response to determining that the UE is paged:
determining that the UE has the arranged small data; and
parsing and reading, by the UE, the arranged small data carried by the paging message using the preset arrangement rule.

9. The method according to claim 8, calculating, by the UE according to the preset arrangement rule, a time-frequency resource location occupied by the arranged small data corresponding to a UE identifier of the UE in the paging message; and parsing and reading, based on the time-frequency resource location, the arranged small data corresponding to the UE identifier of the UE.

10. The method according to claim 8, wherein the paging message further comprises indication information that indicates whether each of the N to-be-paged UEs is to parse and read the arranged small data; and the method further comprising: determining, by the UE based on the indication information, whether the UE has the arranged small data, and when the UE has the arranged small data, parsing and reading, by the UE, the arranged small data carried in the paging message.

11. The method according to claim 8, wherein the paging message further comprises location information of a time-frequency resource that corresponds to a UE identifier of the UE; and the method further comprising: determining that the UE has the arranged small data; searching, by the UE, for corresponding location information of a time-frequency resource based on the UE identifier of the UE; and parsing and reading the corresponding arranged small data of the UE.

12. A base station, comprising:
a communications interface;
a memory; and
a processor configured to:
identify, by the base station, N to-be paged user equipment (UEs) for a paging message broadcast, wherein N is an integer greater than 1;
determine, by the base station, M to-be-paged UEs within the N to-be-paged UEs for receiving small data, wherein M is an integer greater than 0 but less than N;
determine, by the base station, a preset arrangement rule agreed upon between the base station and the N to-be-paged UEs;
arrange, by the base station, the small data of the M to-be-paged UEs based on an arrangement sequence of UE identifiers of the M to-be-paged UEs in the paging message, and adding the arranged small data of the M to-be-paged UEs to the paging message for broadcasting; and
broadcast a paging message through the communications interface, wherein the paging message comprises:
UE identifiers of the N to-be-paged UEs; second identification information indicating the M to-be-paged UEs to receive the small data; and
the arranged small data for the M to-be-paged UEs, wherein the arranged small data is data with data volume less than a preset data volume threshold.

13. The base station according to claim 12, wherein the processor is further configured to:
broadcast the UE identifiers of the N to-be-paged UEs and the small data in the paging message according to the preset arrangement rule.

14. The base station according to claim 13, wherein the arrangement sequence of the UE identifiers of the M to-be-paged UEs in the paging message comprises:
an descending order of the UE identifiers of the M to-be-paged UEs; or
an ascending order of the UE identifiers of the M to-be-paged UEs.

15. The base station according to claim 14, wherein data lengths of the arranged small data of the M to-be-paged UEs are not equal, and the paging message further comprises first indication information for indicating data length information of the arranged small data, respectively, corresponding to the M to-be-paged UEs.

16. The base station according to claim 12, wherein the paging message further comprises location information of time-frequency resources that correspond to the UE identifiers of the M to-be-paged UEs, wherein the location information of the time-frequency resources enable the M to-be-paged UEs to each parse and read corresponding arranged small data of the M to-be-paged UEs.

* * * * *